US010232500B2

(12) United States Patent
Lindell

(10) Patent No.: US 10,232,500 B2
(45) Date of Patent: Mar. 19, 2019

(54) IMPACT MACHINE

(71) Applicant: Swerea IVF AB, Molndal (SE)

(72) Inventor: Hans Lindell, Västra Frölunda (SE)

(73) Assignee: SWEREA IVF AB, Molndal (SE)

( * ) Notice: Subject to any disclaimer, the term of this patent is extended or adjusted under 35 U.S.C. 154(b) by 718 days.

(21) Appl. No.: 14/740,842

(22) Filed: Jun. 16, 2015

(65) Prior Publication Data

US 2015/0367492 A1     Dec. 24, 2015

Related U.S. Application Data

(63) Continuation-in-part of application No. PCT/EP2013/076996, filed on Dec. 17, 2013.
(Continued)

(30) Foreign Application Priority Data

Dec. 17, 2012  (EP) .................................... 12197489
Jun. 16, 2014  (EP) .................................... 14172593

(51) Int. Cl.
   *B25D 17/24*   (2006.01)
   *F16F 7/116*   (2006.01)

(52) U.S. Cl.
   CPC ............. *B25D 17/24* (2013.01); *F16F 7/116* (2013.01); *B25D 2217/0092* (2013.01); *B25D 2250/245* (2013.01)

(58) Field of Classification Search
   CPC ............ B25D 17/24; B25D 2217/0092; B25D 2250/245; F16F 7/116
(Continued)

(56) References Cited

U.S. PATENT DOCUMENTS 4,478,293 A * 10/1984 Weilenmann ........ B25D 17/043
                                                           173/162.2
2006/0289185 A1* 12/2006 Hahn ...................... B25D 17/24
                                                           173/210
(Continued)

FOREIGN PATENT DOCUMENTS

CN     101235869 A    8/2008
CN     101412213 A    4/2009
(Continued)

OTHER PUBLICATIONS

International Search Report PCT/ISA/210 for International Application No. PCT/EP2013/076996 dated (Dec. 17, 2013).
(Continued)

*Primary Examiner* — Hemant M Desai
*Assistant Examiner* — Mobeen Ahmed
(74) *Attorney, Agent, or Firm* — Harness, Dickey & Pierce, P.L.C.

(57) ABSTRACT

The invention relates to an impact machine (100, 200) which is adapted to perform a hammering operation on a surface or an object to be worked upon.
In particular, a vibration reduction arrangement (140, 240) is attached to the housing (105, 205, 305, 405) and comprises a movable counterweight, interacting with a motion reversing arrangement having a non-linear spring characteristics, such that the motion of the counterweight can be brought into a counter-acting movement in relation to the vibrations in the housing (105, 205, 305, 405) of the hammering element (110, 210, 310, 410) thus substantially reducing the vibrations.

8 Claims, 28 Drawing Sheets

Related U.S. Application Data

(60) Provisional application No. 61/738,007, filed on Dec. 17, 2012.

(58) Field of Classification Search
USPC .......................................... 173/162.1, 162.2
See application file for complete search history.

(56) References Cited

U.S. PATENT DOCUMENTS

| | | | | |
|---|---|---|---|---|
| 2008/0006426 A1* | 1/2008 | Friedrich | ................ | B03C 1/286 173/210 |
| 2008/0179797 A1* | 7/2008 | Manschitz | ............. | B25D 17/24 267/137 |
| 2009/0090528 A1* | 4/2009 | Manschitz | ............. | B25D 17/24 173/162.1 |
| 2012/0055689 A1 | 3/2012 | Wierer et al. | | |
| 2012/0267136 A1 | 10/2012 | Mossnang | | |
| 2012/0279741 A1 | 11/2012 | Schlesak et al. | | |
| 2012/0318551 A1* | 12/2012 | Kuhnle | ................ | B25D 17/24 173/162.2 |

FOREIGN PATENT DOCUMENTS

| | | | | |
|---|---|---|---|---|
| CN | 101476610 A | 7/2009 | | |
| CN | 101965247 A | 2/2011 | | |
| CN | 102666027 A | 9/2012 | | |
| CN | 102744715 A | 10/2012 | | |
| DE | 815179 C * | 10/1951 | ............. | B25D 17/24 |
| DE | 102009046348 A1 | 5/2011 | | |
| DE | 102010040173 A1 | 3/2012 | | |
| DE | 102012203758 A1 | 9/2013 | | |
| EP | 1415768 A1 | 5/2004 | | |
| EP | 1736283 A2 | 12/2006 | | |
| EP | 2127821 A1 | 12/2009 | | |
| EP | 2529892 A1 | 12/2012 | | |
| WO | WO-9402755 A1 | 2/1994 | | |
| WO | WO 9402755 A1 * | 2/1994 | ............. | B60G 13/16 |
| WO | WO-2011072918 A1 | 6/2011 | | |

OTHER PUBLICATIONS

Written Opinion of the International Searching Authority PCT/ISA/237 for International Application No. PCT/EP2013/076996 dated (Dec. 17, 2013).

International Preliminary Report on Patentability for International Application No. PCT/EP2013/076996 dated Mar. 12, 2014.

Den Hartog, J.P. "Two Degrees of Freedom." 1985. *Mechanical Vibrations*. 87-106.

Den Hartog, J.P. "Dynamic Vibration Absorbers and Auxiliary Mass Dampers, Influence of a Simple Auxiliary Mass System." 1987. *Shock and Vibration Handbook*. 6-6-6-15.

Chinese Office Action dated Jan. 7, 2016 issued in corresponding Chinese Application No. 201380064879 (with English translation).

International Search Report and Written Opinion dated Sep. 1, 2015 issued in corresponding International Application No. PCT/EP2015/063429.

* cited by examiner

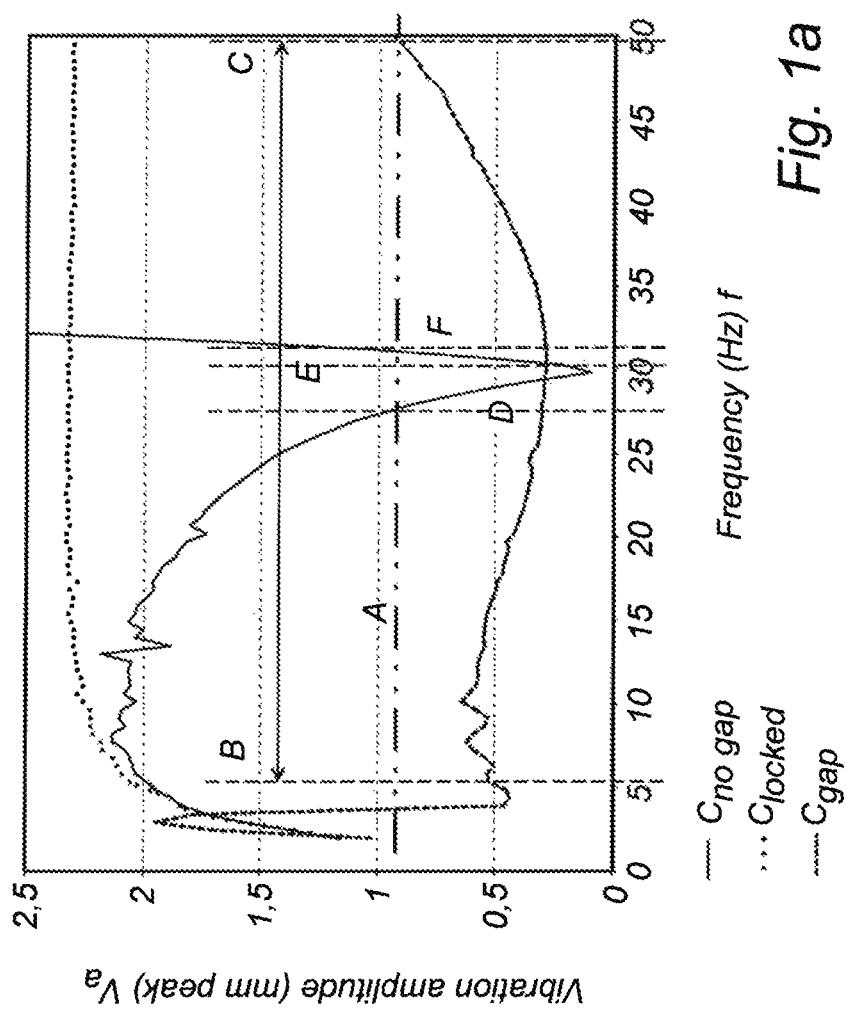

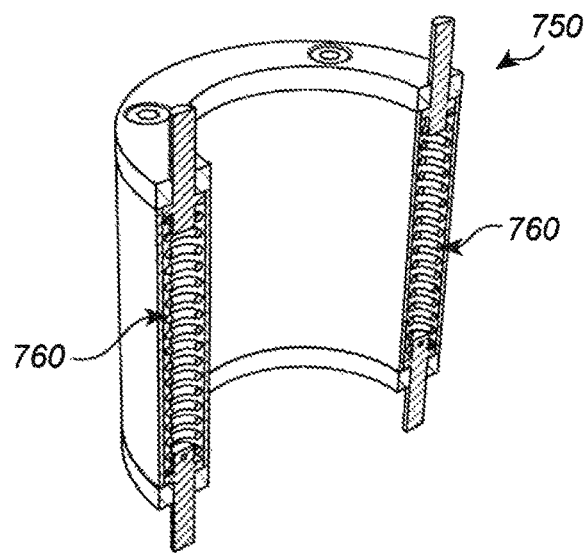
Fig. 6
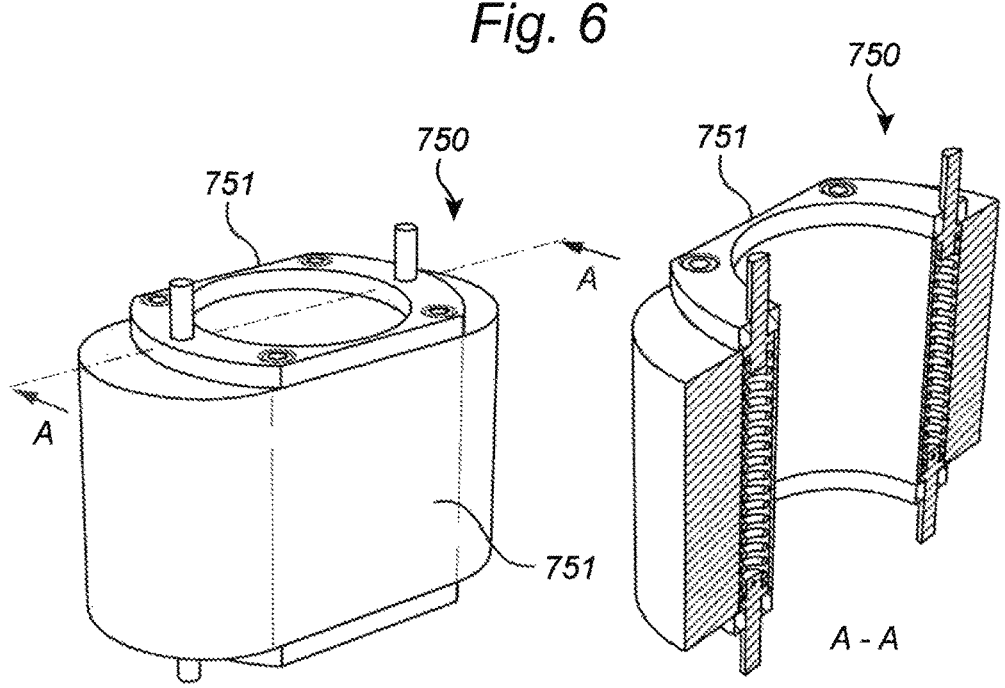
Fig. 7
Fig. 8

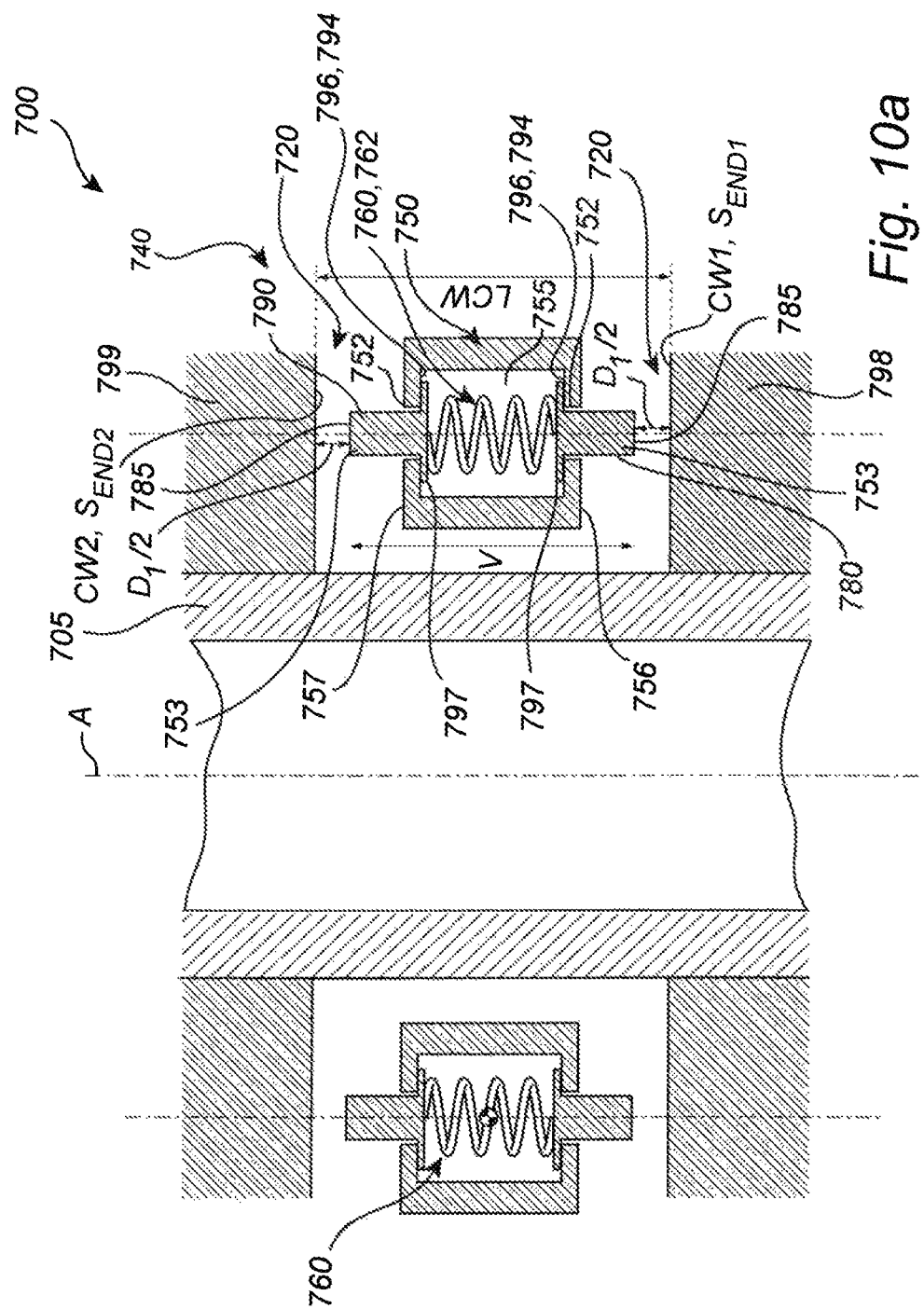

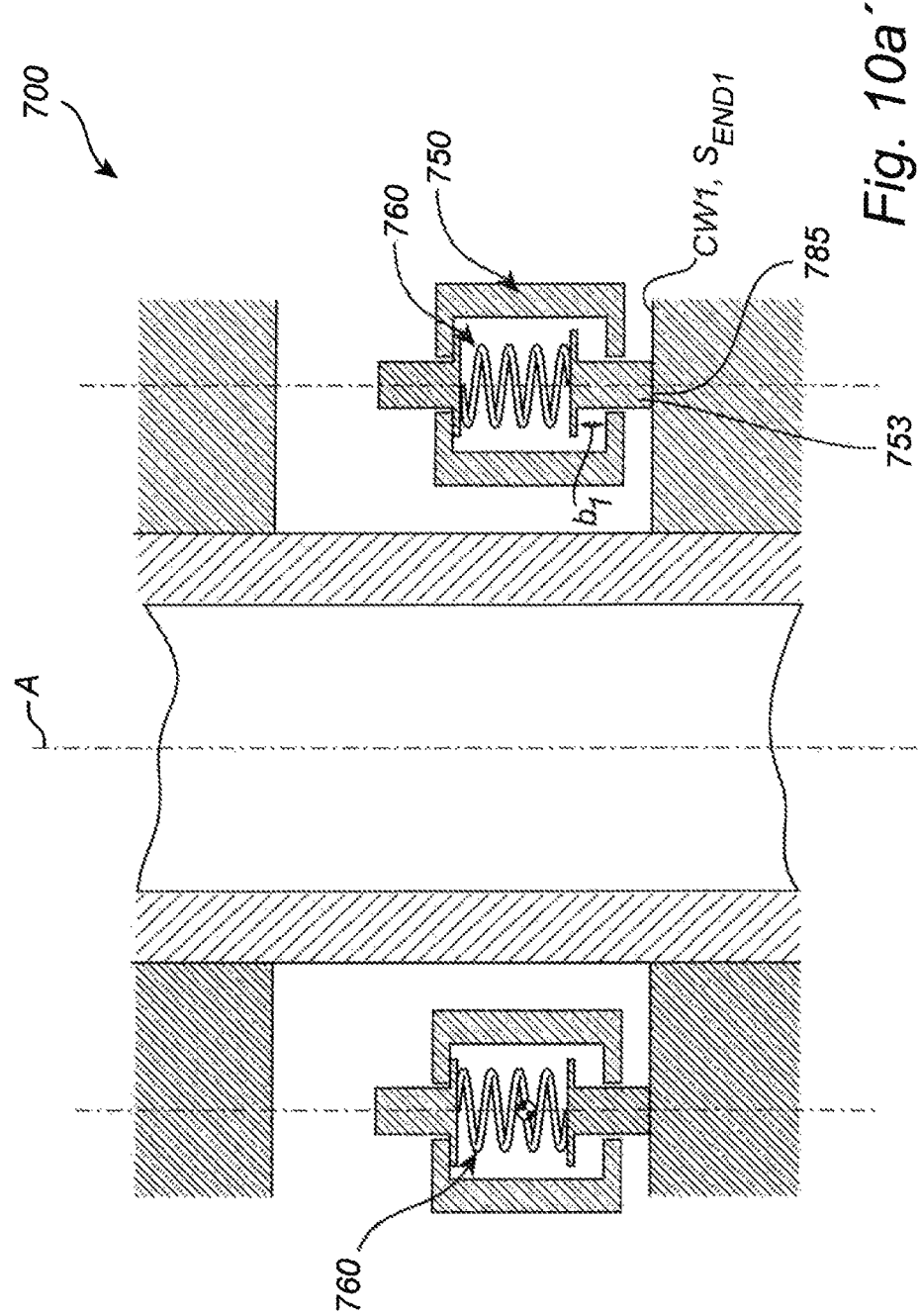

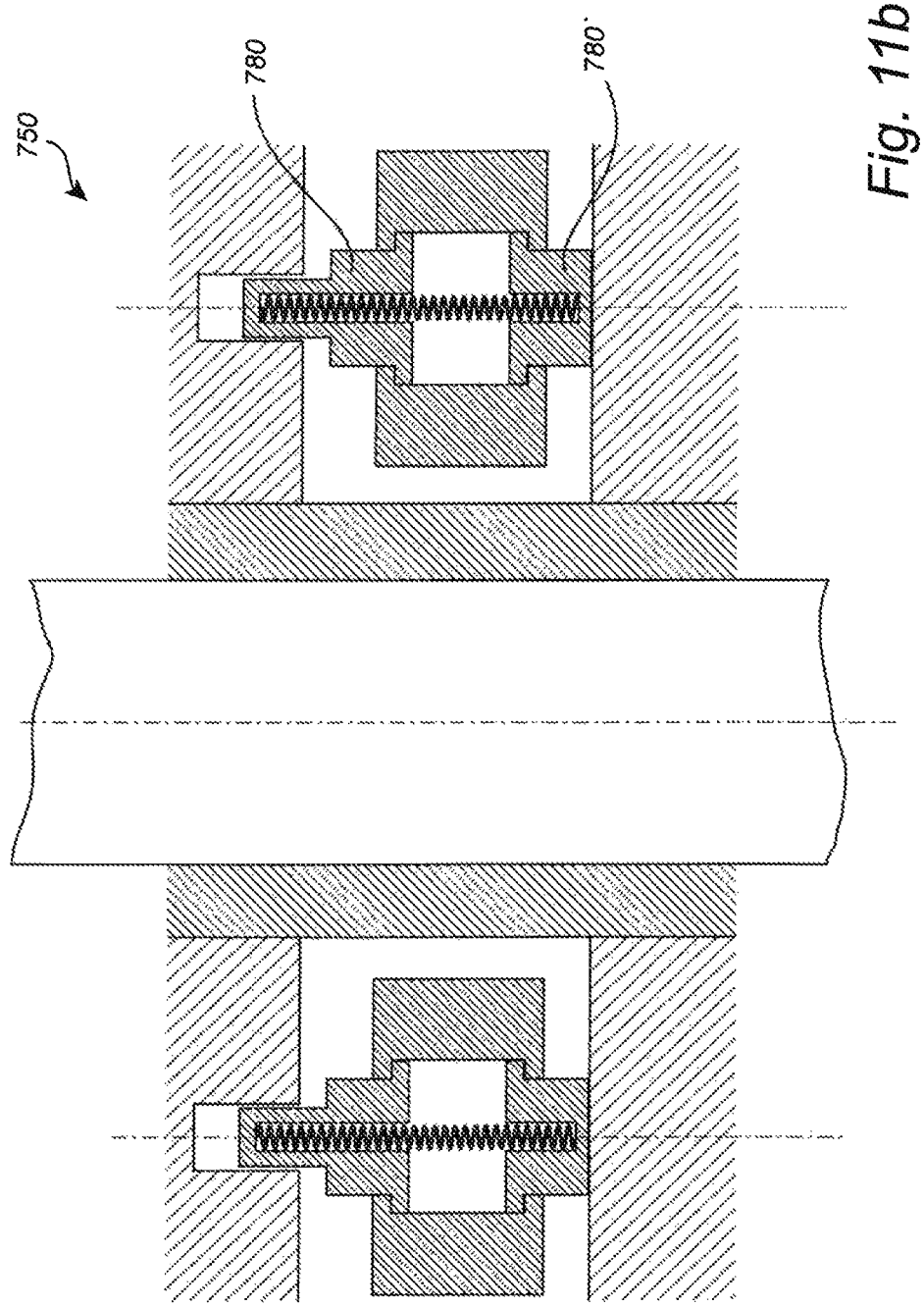

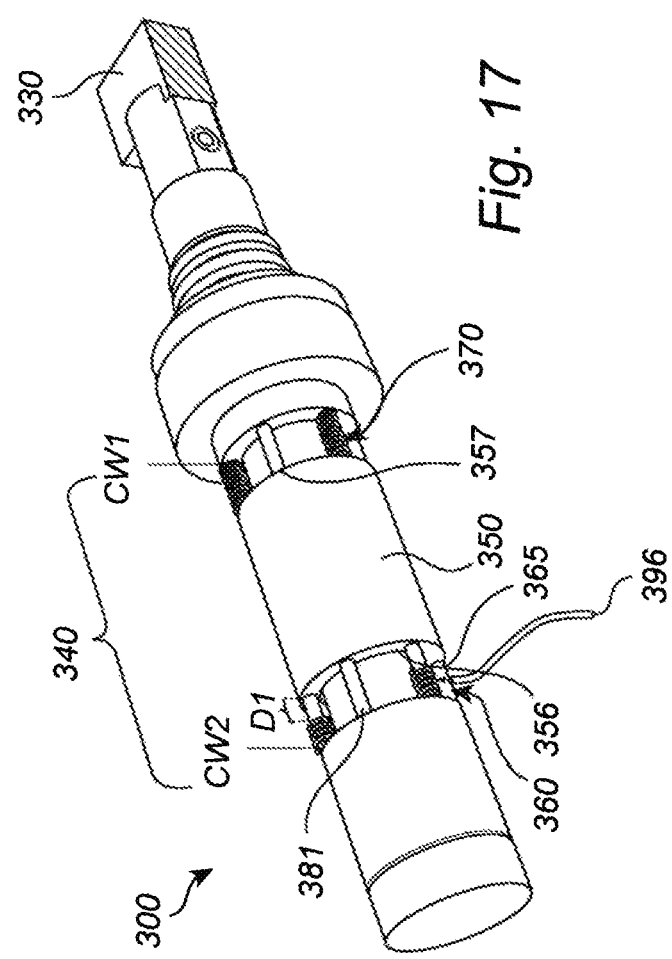

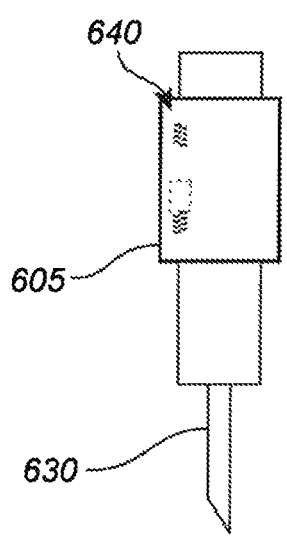
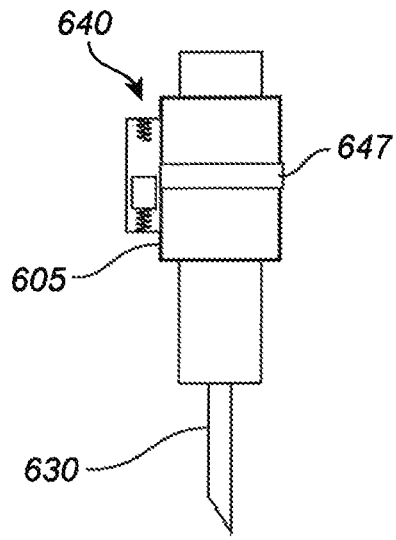
Fig. 20a    Fig. 20b
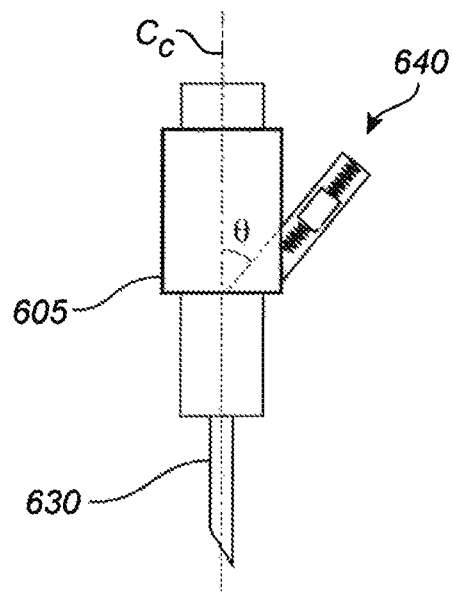
Fig. 20c

IMPACT MACHINE

This application is a Continuation in Part of PCT International Application No. PCT/EP2013/076996 which has an International filing date of Dec. 17, 2013, and which claims priority to European Patent Application No. 12197489.3, filed on Dec. 17, 2012, and U.S. Provisional Application No. 61/738,007, filed on Dec. 17, 2012, the entire contents of both of which are incorporated herein by reference. This application also claims priority to EP 14172593.7, filed on Jun. 16, 2014, the entire contents of which are incorporated herein by reference.

FIELD OF THE INVENTION

The present invention relates to the field of impact machines, and more specifically to impact machines comprising a vibration reduction arrangement.

BACKGROUND AND SUMMARY OF THE INVENTION

Impact machines are frequently used in quarries, road construction and building construction applications in order to work hard surfaces, such as rock, concrete and pavements or softer materials such as asphalt. The invention can be used on machines such as rock drills, breakers, rammers and hammers which all have a similar impact mechanism.

A common design for impact machines comprises hydraulic, pneumatic, combustion engine or electrical actuating means and a movable impact element transferring an impact force to a work tool attached to the housing. In operation, fatigue in a hard surface may be achieved by applying a continuous impact force from the work tool, such that the hard surface finally breaks. However, parts of the vibrations from the movements of the impact mechanism are transferred to the housing of the impact machine and to a connection point for either a manual handle or to a bracket for a machine attachment. The vibrations may thus result in body injuries if the tool is hand-held and in machine wear if the tool is attached to a machine.

An example of a vibration dampening mechanism for a hand-held machine tool is disclosed in the document US2012/0279741. The vibration damping mechanism comprises a movable counterweight arranged between two identical sets of compression springs. Each set comprises two springs of different lengths arranged in parallel; the longest spring is in constant contact with the counterweight, and the shortest spring is only in contact with the counterweight at high vibration amplitudes.

When the vibration amplitude of the counterweight is increased, the springs that are connected in parallel are both activated, such that the spring constants are added and the spring constant in the vibratory damping mechanism is increased. This shifts the natural frequency of the vibration damping means towards higher frequencies.

The purpose of the short springs arranged at a distance from the counterweight is to prevent striking of the mechanical limit position. Under normal operating conditions, the short springs will not be in contact with the counterweight.

The document DE102009046348 discloses another example of a vibration damping mechanism for a hand-held machine tool that comprises a counter acting weight. In order to provide a cost efficient method of producing the vibration damping mechanism, the geometry of a coil spring can be varied such that a central region of the spring has a certain weight that is sufficient to create a counter-acting weight. The central region is provided with a weight by arranging it like a tension spring with a large diameter and with compact windings. Alternatively, an external or internal counterweight can be attached to the central region to achieve a heavier counterweight. The central region is received between two elastic compression springs that are provided with stiff end-portions connected to a housing. However, the arrangement in DE102009046348 does not provide any means for extending the dampened frequencies range of the machine tool.

In view of the above, it is an object of the present invention to provide an improved vibration damping arrangement for an impact machine that is providing a vibration damping effect throughout a wide working frequency range of the machine and that also reduces the risk of sudden disruptions in the vibration damping effect. A further object is to provide a stronger feed-force of the impact machine, such that the weight of the hammering can be reduced. The inventor was recently given the assignment of trying to find a way to reduce the vibrations of the handles in hand held impact machine. As an example of a machine on the market he was given an impact machine, Atlas-Copco, KV434, having an impact energy of about 25 Joules, and a total weight of 12 kg whereof the impact element had a weight of 0.53 kg. The idea behind the vibration reduction arrangement of this machine, resided in making the machine sufficiently heavy such that the amplitude of the vibrations would be reduced due to the weight of the machine. However, still with this heavy weight, the machine generated very high vibrations in the range around region of 20 m/s$^2$, hand arm weighted acceleration.

In the beginning of the project, the inventor made an analysis of possible ways to lowering the vibrations in the handles, and came up with the following ideas:
  (a) providing vibration isolation means (such as springs or shock absorbers) e.g. between the impact mechanism and the handles,
  (b) using a actively controlled counterweight, which applies the substantially same force to the housing as the hammering element but in the opposite direction, or
  (c) using a tuned vibration absorber.

Knowing that tuned vibration absorbers, such as the ones described by J. P. Den Hartog in "*Mechanical Vibrations*", 1985, or "*Shock and Vibration Handbook*", 1987, where a counterweight is coupled to an active weight by means of a spring, would only work within a very limited frequency interval; the inventor quickly gave up that idea. These types of vibration dampers are also referred to as "vibration reduction methods for narrow frequency ranges" in the following text, and are normally applied to devices having a very limited variation in working frequency, such as air plane engines or marine engines.

The reason for the inventor to abandon the idea of using vibration reduction methods for narrow frequency rages, was that the hand-held impact machines of the type the inventor was working with have a working frequency which varies through a wide frequency range, they normally presented a variation of 20-30% in working frequency and sometimes as high as 50%. The working frequency may vary due to e.g. instability in the control of the element e.g. due to instability in the compressed air supply to the machine, due to the operator holding the machine in varying angles in relation to the surface which is to be cut, due to a variation in the force by which the operator presses the machine against the surface, due to a varying surface hardness at different locations in the element which is to be cut, etc (the list is non-exhaustive).

However, as a comparative example the inventor wanted to give an illustration of how badly the "vibration reduction methods for narrow frequency rages" worked for impact machines. But when he was about to connect a counterweight to the housing of the impact machine by means of one spring at each end of the counterweight he realized that he did not have sufficiently strong springs at home to get the right working frequency. Not letting this stop him, he simply used the strongest once he had at hand.

As predicted, the dampening arrangement did not work at all when he turned the machine on. The machine just bounced around, being extremely difficult to control. Try to picture his surprise when, after a while, the bouncing suddenly stopped and there were hardly any vibrations in the handles at all. The inventor turned the machine off and then on again, and still the vibrations were almost eliminated. There was no reasonable explanation to this.

When he later disassembled the machine, he could see nothing unordinary except that the force of the counterweight had compressed the springs, such that there were gaps between the counterweight and the springs. Hence, he could see no other explanation, besides that it was the gap between the spring and the counterweight that had balanced the system. Encouraged by this, he started to simulate the system to see if his conclusions could be correct—and it turned out that they were.

After the inventor had analyzed his findings, he has come to the conclusion that the surprising vibration reducing effect may not only be achieved by arranging a gap between the counterweight and the springs, but also by means of alternative measures as will be described below.

The present invention is described in the independent claim, and advantageous embodiments of the present invention are defined in the dependent claims.

According to a first aspect of the present invention, there is provided an impact machine comprising:

a housing a hammering element arranged inside said housing, said hammering element is displaceable between a first hammering element position and a second hammering element position, an impact receiving element attached to said housing (105; 205), actuating means (115; 215) arranged to cause said hammering element (110; 210) to perform a hammering operation on said impact receiving element (130; 230), a vibration reduction arrangement (140; 240) attached to said housing (105;205), which comprises:

a counterweight (150; 250) being displaceable in a first axial direction (A) between a first counterweight position (CW1) and a second counterweight position (CW2) in response to the hammering action of said hammering element (110; 210), at least one motion reversing mechanism (180; 280) each of said motion reversion mechanism comprising at least one spring-action arrangement (160; 260), each of said at least one spring-action arrangements (160; 260), being arranged to reverse the direction of motion of said counterweight (150; 250), wherein said counterweight (150) is arrangeable at a position located between said first counterweight position (CW1) and said second counterweight position (CW2) from which position said counterweight (150) is movable a first distance (D1) extending in said first axial direction (A) without actuating said at least one spring-action arrangement (160).

According to a second aspect of the present invention, there is provided an impact machine comprising:

a housing a hammering element arranged inside said housing, said hammering element is displaceable between a first hammering element position and a second hammering element position, an impact receiving element attached to said housing (105; 205), actuating means (115; 215) arranged to cause said hammering element (110; 210) to perform a hammering operation on said impact receiving element (130; 230), a vibration reduction arrangement (140; 240) attached to said housing (105;205), which comprises:

a counterweight (150; 250) being displaceable in a first axial direction (A) between a first counterweight position (CW1) and a second counterweight position (CW2) in response to the hammering action of said hammering element (110; 210), at least one motion reversing mechanism (180; 280) each of said motion reversion mechanism comprising at least one spring-action arrangement (160; 260), each of said at least one spring-action arrangements (160; 260), being arranged to reverse the direction of motion of said counterweight (150; 250), wherein said vibration reduction arrangement (240) further comprises a first end surface ($S_{End1}$), said at least one spring action arrangement (260) being arranged between said counterweight (250) and said first end surface ($S_{End1}$), said at least one spring action arrangement (260) comprising a first spring-action member (261) attached to said counterweight (250), and a second spring-action member (272) arranged in series with said first spring-action member (261) in said first axial direction (A) and being attached to said first end surface ($S_{End1}$) and said first spring action member (261); said first spring-action member (261) having a first spring characteristics comprising a first spring coefficient ($k_1$) within the interval $-k_{trad} \leq k_1 \leq k_{trad}/2$ and $k_1 \neq 0$, and the second spring-action member (262) having a second spring characteristics comprising a second spring coefficient ($k_2$) within the interval $k_{trad}/5 \leq k_2 \leq 30 \cdot k_{trad}$, and $k_{trad}$ is determined from the following formula $$F_{res} = \frac{1}{2\pi}\sqrt{\frac{k_{trad}}{m}}$$

$F_{res}$ being the resonance frequency of the impact machine at rated power, and m the weight of the counterweight (250).

In more detail, said first spring coefficient ($k_1$) may be arranged within the interval $-k_{trad} \leq k_1 \leq k_{trad}/2$, or $-k_{trad}/4 \leq k_1 \leq k_{trad}/4$, or $-k_{trad}/6 \leq k_1 \leq k_{trad}/6$. In all embodiments without gap $k_1 \neq 0$, or $k_1 \leq 0.001 \cdot k_{trad}$ or $k_1 \leq 0.01 \cdot k_{trad}$; or $k_1 \geq -0.001 \cdot k_{trad}$ or $k_1 \geq -0.01 \cdot k_{trad}$. $k_1 < 0$ may be achieved by means of e.g. pressurized air or magnetic means as described in more details below.

According to a third aspect of the present invention, there is provided an impact machine comprising:

a housing a hammering element arranged inside said housing, said hammering element is displaceable between a first hammering element position and a second hammering element position, an impact receiving element attached to said housing,
actuating means arranged to cause said hammering element to perform a hammering operation on said impact receiving element,
a vibration reduction arrangement attached to said housing, which comprises:
   at least one counterweight distributed around said hammering element and being displaceable in a first axial direction between a respective first counterweight position and a respective second counterweight position in response to the hammering action of said hammering element, —a respective first motion reversing mechanism for each one of said at least one counterweight, each respective first motion reversion mechanism comprising a first spring-action arrangement being arranged to reverse the direction of motion of a respective one of said at least one counterweight,
wherein
each one of said at least one counterweight is arrangeable at a position located between said respective first counterweight position and said respective second counterweight position from which position each one of said at least one counterweight is movable a first distance extending in said first axial direction without actuating said first spring-action arrangement; and wherein
the spring action arrangement of said respective first motion reversing mechanism is arranged inside said respective one of said at least one counterweight,
each of said respective first motion reversing mechanism further comprises a first end surface attached to said housing and arranged adjacent to said respective first counterweight position and
each one of said at least one counterweight comprises a first projecting member, which projecting member comprises an engaging surface, which engaging surface is connected to said respective spring action arrangement and arranged between said respective spring action arrangement and said first end surface in said first axial direction, wherein
when any of said at least one counter weight is arranged in said respective first counterweight position:
said engagement surface and said first end surface are pressed against each other,
said at least one spring-action arrangement is actuated.

According to a fourth aspect of the present invention, it relates to a impact machine comprising:
a housing,
a hammering element arranged inside the housing, which is displaceable between a first hammering element position and a second hammering element position,
an impact receiving element attached to the housing,
actuating means arranged to cause the hammering element to perform a hammering operation on the impact receiving element,
a vibration reduction arrangement attached to the housing, which comprises:
   a counterweight being displaceable between a first counterweight position and a second counterweight position in response to the impact action of the hammering element,
   a first motion reversing mechanism located at the first counterweight position, arranged to receive the counterweight when in motion towards the first counterweight position, and arranged to reverse the direction of motion of the counterweight, wherein the first motion reversing mechanism comprises:
   a first spring-action member arrangeable at a first distance from the counterweight when the spring-action member is at rest;
or
   a first spring-action member and a second spring-action member arranged in series such that one of the spring-action members is attached to the counterweight; the first spring-action member having a first spring characteristics and the second spring-action member having a second spring characteristics, which is different from the first spring characteristics.

The housing may also be referred to as a hammer element housing, which is the housing in which the hammering element is arranged, and also the housing to which the vibration reduction arrangement is attached.

In essence the inventors have realized that the invention relates to an impact machine which is adapted to perform a hammering operation on a surface or an object to be worked upon.

In particular, a vibration reduction arrangement is attached to the housing and comprises a movable counterweight, interacting with a motion reversing arrangement having a non-linear spring characteristics, such that the motion of the counterweight can be brought into a counteracting movement in relation to the vibrations in the housing of the hammering element thus substantially reducing the vibrations.

Generally for this invention it is desirable to minimize the damping, so that the velocity of counterweight in the opposite direction is as high as possible. If possible even a negative damping is desirable, and this can be achieved e.g. via compressed air. For example the damping at rated power is between −25% and +25% of critical damping. Alternatively the lower end may be −15%, −10%, −5%, −1% or −0.1% or 0% of critical damping. Additionally or alternatively the higher end may be 15%, 10%, 5%, 1% or 0.1% or 0% of critical damping.

In more detail an improved vibration reducing arrangement may be achieved by providing a motion reversing arrangement having a low force zone and a high force zone, wherein the low force zone is activated before the high force zone when the motion of the counterweight is decelerated and reversed. The spring coefficient of the low force zone may correspond to a first spring coefficient ($k_1$) which e.g. is $-k_{trad} \leq k_1 \leq k_{trad}/2$, and the spring coefficient of said high force zone e.g. is $k_{trad}/5 \leq k_2 \leq 30*k_{tra}$ when at least one member of said motion reversing arrangement is prestressed or biased. Alternatively, the spring coefficient of said high force zone is preferably $2*k_{trad} \leq k_2 \leq 30*k_{trad}$ when said motion reversing arrangement is not prestressed or biased. $k_{trad}$ is determined from the following formula $$F_{res} = \frac{1}{2\pi}\sqrt{\frac{k_{trad}}{m}}$$

$F_{res}$ being the resonance frequency of the impact machine at rated power, and m the weight of the counterweight, Furthermore, two motion reversing arrangement may be provided, one on each side of the counterweight, wherein the sum of the lengths the respective low force zones (length of low force zone 1+of low force zone 2) preferably is at least 30% or at least 40% of the distance between said first counterweight position and said second counterweight position. When $k_1$=0, said low force zone is a gap, when $k_1 \neq 0$ said low force zone may comprise one or more spring action members having a resulting first spring coefficient $k_1$. Moreover, the motion reversing mechanism may be attached to said counterweight and/or an end surface, or being loose (i.e. not attached to anything) as long as the described low and high force zones are provided. As stated above the at least one counterweight can be distributed around said hammering element. According to one example the counterweight is only one counterweight which fully surrounds said hammering element; or alternatively if there are several counterweights, they may be evenly distributed around said hammering element.

The term "without actuating" in: "said at least one counterweight being arrangeable at a position located between said first counterweight position and said second counterweight position from which position said at least one counterweight is movable a first distance extending in said first axial direction without actuating said at least one spring-action arrangement" means that the counterweight can move said first distance without the at least one spring-action arrangement is being compressed. I.e. an influence on the at least one spring-action arrangement by the counterweight moving said first distance does not makes the at least one spring-action arrangement actuated. The engaging surface can also be called connecting surface. More details may be found below.

The counterweight is normally not filled with oil or other liquids for damping purposes. Oil can however be used for lubrication purposes.

According to at least one exemplary embodiment said vibration reduction arrangement further comprises:
 a respective second motion reversing mechanism for each one of said at least one counterweight, each respective second motion reversion mechanism comprising a second spring-action arrangement being arranged to reverse the direction of motion of a respective one of said at least one counterweight, and
the spring action arrangement of said respective second motion reversing mechanism is arranged inside said respective one of said at least one counterweight,
each of said respective second motion reversing mechanism further comprises a second end surface attached to said housing and arranged adjacent to said respective second counterweight position and
each one of said at least one counterweight comprises a second projecting member, which projecting member comprises an engaging surface, which engaging surface is connected to said respective second spring action arrangement and arranged between said respective spring action arrangement and said second end surface in said first axial direction (A) wherein
when any of said at least one counter weight is arranged in said respective second counterweight position:
said engagement surface of said second projecting member and said second end surface are pressed against each other,
said engagement surface of said second projecting member is displaced relative a center of gravity of said counterweight compared to when said counterweight is arranged in a position where said engagement surface of said second projecting member and said second end surface are separated from each other, and
said second spring-action arrangement is actuated.

Below is listed a number of exemplary embodiments, which are based a respective one of the four aspects described above.

According to at least one exemplary embodiment said spring action arrangement of said first motion reversing mechanism is separated from said spring action arrangement of said second motion reversing mechanism.

According to at least one exemplary embodiment the first motion reversing mechanism may comprise a non-linear spring with a weaker section and a stiffer section, wherein the weaker section is in contact with the counterweight. Examples of non-linear springs may comprise coil springs with a diameter that changes as a function of the length of the non-linear spring, which may e.g. result in a conical spring shape.

According to at least one exemplary embodiment said spring action arrangement of said first motion reversing mechanism and said spring action arrangement of said second motion reversing mechanism is one and the same.

According to at least one exemplary embodiment said spring action arrangement of said first motion reversing mechanism comprises a first spring action member.

According to at least one exemplary embodiment said spring action arrangement of said second motion reversing mechanism comprises a second spring action member.

According to at least one exemplary embodiment said spring action member of said first motion reversing mechanism is separated from said spring action member of said second motion reversing mechanism.

According to at least one exemplary embodiment said spring action member of said first motion reversing mechanism and said spring action member of said second motion reversing mechanism is one and the same.

According to at least one exemplary embodiment said first spring action member is prestressed, and has a first spring characteristics ($k_1$) within the interval $k_{trad}/5 \leq k_1 \leq 30*k_{trad}$. Alternatively said first spring action member is not prestressed, and has a first spring characteristics ($k_1$) within the interval $2*k_{trad} \leq k_1 \leq 30*k_{trad}$.

According to at least one exemplary embodiment said second spring action member is prestressed, and has a first spring characteristics ($k_1$) selected such that the resulting spring characteristics of the two spring actions members is within the interval $k_{trad}/5 \leq k_1 \leq 30*k_{trad}$, when one or both are prestressed. Alternatively, neither of the spring actions members are prestressed and the resulting spring characteristics of the two spring actions members is within the interval $2*k_{trad} \leq k_1 \leq 30*k_{trad}$.

According to at least one exemplary embodiment said motion reversion mechanism comprises four spring-action arrangements distributed around said hammering element.

According to at least one exemplary embodiment said counterweight comprises two spring-action arrangements inside said counterweight.

According to at least one exemplary embodiment said two spring-action arrangements are identical.

According to at least one exemplary embodiment said counterweight further comprising restricting means adapted to restrict the movement of said projecting member in the first axial direction and/or in a direction opposite thereto.

According to at least one exemplary embodiment said restricting means comprises at least one first retaining surface attached to said counterweight, and said projecting member further comprises at least one flange, wherein said retaining surface restricts the motion of said flange in the first axial direction and/or in a direction opposite thereto.

According to at least one exemplary embodiment said restricting means further comprises a second retaining surface adapted to restrict the movement of said second projecting member in said second axial direction and/or in a direction opposite thereto, and said spring action member is biased by said first retaining surface and said second retaining surface.

According to at least one exemplary embodiment said vibration reduction arrangement is arranged around said housing, such that said at least one counterweight is rotatable about a central longitudinal axis of said housing, coaxial with said first axial direction.

According to at least one exemplary embodiment said impact machine further comprises counterweight guiding means arranged to cause said counterweight to move in a linear direction between said first counterweight position and said second counterweight position.

According to at least one exemplary embodiment when said at least one counterweight is only one counterweight, said counterweight fully surrounds said hammering element.

According to at least one exemplary embodiment when said at least one counterweight comprises of two or more counterweights, said counterweights are evenly distributed around said hammering element.

According to at least one exemplary embodiment said counterweight comprises an outer truncated elliptical cross-section which is perpendicular to said first axial direction.

According to at least one exemplary embodiment said at least one spring-action arrangement further comprises a first spring-action member and a second spring-action member arranged in parallel in said first axial direction. What is stated herein about the spring coefficient in a system having non-parallel spring members, may also be applied to the resulting spring coefficient of a system having two or more parallel spring action members.

According to at least one exemplary embodiment the first distance ($D_1$) is at least 20%, or at least 40%, or at least 60% or at least 70% or at least 80% of the distance between the first and the second counterweight positions. According to at least one exemplary embodiment a first spring action member and a second spring action member arranged in parallel, wherein said first spring coefficient of said first spring-action member is lower than said second spring coefficient of said second spring-action member, and wherein said first spring coefficient applies to a distance corresponding to at least 10% or at least 15% or at least 20% or at least 25% of a distance between said first and said second counterweight position; and said second spring coefficient applies to a remaining distance between said first and said second counterweight position.

According to at least one exemplary embodiment said impact machine further comprises hammer element guiding means arranged to cause said hammering element to move in a linear direction between said first hammering element position and said second hammering element position.

According to at least one exemplary embodiment said impact receiving element is a work tool.

According to at least one exemplary embodiment said impact machine is handheld.

According to at least one exemplary embodiment said impact machine is arranged to be attached to a machine, preferably a construction machine such as an excavator, backhoe loader or skid steer loader.

According to at least one exemplary embodiment the weight of the hammering element H corresponds to between 20% and 300% of the weight m of the counterweight.

According to at least one exemplary embodiment an impact machine comprises:
a housing,
a hammering element arranged inside said housing, said hammering element is displaceable between a first hammering element position and a second hammering element position,
an impact receiving element attached to said housing,
actuating means arranged to cause said hammering element to perform a hammering operation on said impact receiving element,
a vibration reduction arrangement attached to said housing, which comprises:
  a counterweight distributed around said hammering element and being displaceable in a first axial direction between a first counterweight position and a second counterweight position in response to the hammering action of said hammering element, —a first motion reversing mechanism comprising a first spring-action arrangement being arranged to reverse the direction of motion of said counterweight,
wherein
said counterweight is arrangeable at a position located between said first counterweight position and said second counterweight position from which position said counterweight is movable a first distance extending in said first axial direction (A) without actuating said spring-action; and wherein
the spring action arrangement of said motion reversing mechanism is arranged inside said counterweight,
said first motion reversing mechanism further comprises a first end surface attached to said housing and arranged adjacent to said first counterweight position and
said counterweight comprises a first projecting member, which projecting member comprises an engaging surface, which engaging surface is connected to said spring action and arranged between said spring action arrangement and said first end surface in said first axial direction wherein when said counter weight is arranged in said first counterweight position:
said engagement surface and said first end surface are pressed against each other, and
said at least one spring-action arrangement is actuated.

According to at least one exemplary embodiment an impact machine comprises:
a housing
a hammering element arranged inside said housing, said hammering element is displaceable between a first hammering element position and a second hammering element position,
an impact receiving element attached to said housing,
actuating means arranged to cause said hammering element to perform a hammering operation on said impact receiving element,
a vibration reduction arrangement attached to said housing, which comprises:
  a first number of counterweights arranged evenly distributed around said hammering element, each counterweight being displaceable in a first axial direction between a respective first counterweight position and a respective second counterweight position in response to the hammering action of said hammering element, —a first number of motion reversing mechanisms, each comprising a first spring-action arrangement being arranged to reverse the direction of motion of a respective one of said first number of counterweights, wherein
said each one of said first number of counterweights is arrangeable at a position located between said respective first counterweight position and said respective second counterweight position from which position each one of said at least one counterweight is movable a first distance extending in said first axial direction without actuating said at least one spring-action arrangement; and wherein
said first spring action arrangement of each first motion reversing mechanism is arranged inside said respective one of said first number of counterweights,
each of said respective first motion reversing mechanism further comprises a respective first end surface attached to said housing and arranged adjacent to said respective first counterweight position and
each one of said at least first number of counterweights comprises a first projecting member, which projecting member comprises an engaging surface, which engaging surface is connected to said respective spring action arrangement and arranged between said respective spring action arrangement and said first end surface in said first axial, wherein
when any one of said first number of counter weights is arranged in said respective first counterweight position:
said engagement surface of said counterweight and said respective first end surface are pressed against each other,
said engagement surface is displaced relative a center of gravity of said counterweight compared to when said counterweight is arranged in a position where said engagement surface and said first end surface are separated from each other, and
said at least one spring-action arrangement is actuated.

The present invention provides the advantage of enabling a substantial decrease in the weight of an impact machine, lower vibration amplitude and an extended frequency range of low vibration amplitude. The force from the counterweight on the housing also creates a feed force that improves the efficiency of the machine.

The counterweight moves in a counter-phased movement in relation to the direction of a hammering element, where the travel distance of the counterweight is restricted to a maximum counterweight displacement distance between the first counterweight position and the second counterweight position measured when the machine is operated at rated power. A movement beyond these points is thus not possible, or normally not possible, when the machine is operated at rated power. Hence, depending on e.g. the impact forces, the travel distance of the counterweight may be equal to the maximum counterweight displacement distance, or shorter.

According to said third aspect of the invention the counterweight comprises a projecting member, i.e. a member which, when said counterweight is arranged in said first or second counter weight position, is displaced relative a center of gravity of said counterweight, compared to when said counterweight is arranged in a position where said engagement surface and said first end surface are separated from each other. In other words, when said spring action member is actuated, the projecting member is displaced relative a center of gravity of said counterweight, compared to when said spring action member is unactuated. In these cases, the motion of the center of gravity could preferably be considered when determining the maximum center of gravity displacement distance. I.e. the maximum center of gravity displacement distance equals the distance that the center of gravity of the counterweight travels or passes between the two end positions of the counter weight, when the machine is operated at rated power. In analogy, the center of gravity can also be considered when determining the first center of gravity position. In other words, said first center of gravity position corresponds to that position of the counter weight where the center of gravity of said counterweight is arranged furthest along a first counterweight displacement direction; and said second center of gravity position corresponds to that position where the center of gravity of said counterweight is arranged furthest along a direction opposite to said first counterweight displacement direction, wherein said counterweight displacement direction is equal to said first axial direction (A) or a direction opposite thereto.

The motion reversing mechanisms may be limited in their axial movement by end surfaces, which define fixed surfaces inside the vibration reduction arrangement. Furthermore, they may serve as abutment surface or attachment surfaces for the motion reversing mechanisms. The vibration reduction arrangement may comprise an end surface on each side of the counterweight.

In relation to this invention, the term first spring-action arrangement includes all spring-action members that take part in the reversing of the direction of motion of said counterweight, and which spring-action members are arranged, between a contact surface of the counterweight and a first end-surface.

Further, in relation to this invention, the term second spring-action arrangement includes all spring-action members that take part in the reversing of the direction of motion of the counterweight, and which are arranged between said counterweight and said second end surface.

In relation to this invention, the term discontinuous spring-action force implies a discontinuous change in the force acting upon the counterweight over the maximum counterweight displacement distance, between the first counterweight position and the second counterweight position. Alternatively, a discontinuous spring-action force may be provided by a combination of spring-action members, with different spring coefficients, e.g. first connected to each other in series and then in connection with the counterweight. The spring-action member applies a force on a contact surface of the counterweight. Alternatively, a discrete combination of a spring-action member arranged at a first distance from (i.e. not physically attached to) the counterweight may provide for the discontinuous spring-action force. In the latter example, there is no applied spring-action force on the counterweight throughout the first distance.

When e.g. one non-linear spring abut the counterweight on each end this may be referred to a non-linear spring-action. A non-linear spring may also be referred to as an unlinear spring.

In relation to the present invention, the length of the intermediate distance is determined when the impact machine, as well as the motion reversing mechanism(s), as well as the spring-action member(s) are at rest, i.e. the spring-action member(s) is/are neither compressed nor extended, i.e. the spring-action members are unactuated. In the case of a biased or prestressed spring-action member, the definition of unactuated implies that the spring-action member is only being subject to the inherent biasing force.

Normally, the intermediate distance is most easily determined when the vibration reduction arrangement is positioned with the counterweight's travel direction coinciding with the horizontal plane. Moreover, provided that the spring-action members acting upon the counterweight are at rest, the first distance which hereinafter is also referred to as the gap or the intermediate distance, is defined as a distance between the first and the second end-surface, through which distance the counterweight is freely movable without actuating the spring-action members. In other words, the counterweight is freely movable and the spring-action members are left unactuated. In yet other words, the counterweight is freely movable while all the spring-action members are at rest or unactuated.

A way of determining the length of the gap in the vibration reduction arrangement is to, in the axial direction between the first and the second counterweight positions, measuring:

the distance between the first and second end surfaces,
the unactuated axial lengths of the spring-action members, and
the axial length of the counterweight.

The length of the gap is calculated as the difference between the distance between the first and second end surfaces, subtracted by the length of the counterweight and the axial lengths of the unactuated spring-action members. When there are spring-action members arranged in parallel, the unactuated length is defined by the distal ends of the longest spring-action member. When there are spring-action members arranged in series, the unactuated length is defined by the total axial length of the members in series. Moreover, the axial length of the counterweight is defined by the counterweight contact surfaces which are adapted to be in contact with the contact surfaces of the spring-action members.

When the counterweight comprises at least one projecting member, the distance of the gap $D_1$ is calculated as the distance between the first and the second counterweight position subtracted by the exterior length (maximum axial length) of the counterweight 750 including the extension of the projecting members from the outer surfaces of the counterweight to the respective engaging surfaces.

The term first axial direction is the axial travel direction of the counterweight. The direction is parallel with the axial extensions of the spring action members.

In relation to this invention the term engaging surface, also called contacting surface, of a projecting member refers to the surface of the projecting member, which is in contact with a first or a second end surface when the spring-action member is being compressed. In a similar way, the term contact surface of a counterweight refers to the surface of the counterweight, which is in contact with the spring-action member as the latter is being compressed; this term is normally used when the spring action members are arranged outside the counter weight.

The purpose of the spring-action member is to reverse the motion of the counterweight. Within the scope of the present invention, there are numerous ways of selecting and designing a spring-action member, whereby the invention should not be limited to any particular type. However, depending on the type of spring-action member, different parameters/coefficients may be used to specify the motion reversing capabilities of the spring-action member. In particular, the expression spring characteristics should be interpreted in a wide sense. Some embodiments of the spring-action member present a linear elasticity and may therefore be characterized in terms of a linear spring coefficient k according to Hook's law. Other embodiments of the spring-action member may include materials which present a spring characteristics corresponding to a non-linear spring coefficient. Still other embodiments of the spring-action member may include materials which present a spring characteristics corresponding to a combination of a spring coefficient k and a dampening coefficient c, such as rubber, solid or foamed polyurethane, etc. (The list in non-exhaustive)

Hence, spring-action members may include materials which present a non-linear elasticity, like for instance rubber, steel material, non-linear springs or air cushions. Further, a spring-action member hereby refers to any type of member, which is capable of providing a motion reversing action on the counterweight. In addition, the spring-action member may have various geometric shapes, like a coil spring, rubber ball or a surface, such as a plate.

The advantages include that the vibrations from the impact machine are dampened for a large working frequency range and the absence of a sudden vibration increase enables the vibration reduction arrangement to exclude a safety zone; as well as that many different elements may be applied, giving rise to a vast design freedom.

According to one embodiment, wherein said counterweight is arrangeable at a position located between said first counterweight position and said second counterweight position from which position said counterweight is movable a first distance extending in said first axial direction without actuating said at least one spring-action arrangement, and said at least one spring action arrangement is arranged inside said counterweight, and said vibration reduction arrangement further comprises:

a first end surface arranged adjacent to said first counterweight position and
a second end surface arranged adjacent to said second counterweight position; said first end surface is arranged to receive said at least one spring action arrangement when in motion towards said first counterweight position; and said second end surface is arranged to receive said at least one spring action arrangement when in motion towards said second counterweight position. Said at least one spring action arrangement may comprise one or more first spring action members which are prestressed and having a resulting spring coefficient within the interval $k_{trad}/5 \leq k_1 \leq 30 \ast k_{trad}$. In case the spring action member(s) of the spring action arrangement are not prestressed, they may have a resulting spring coefficient within the interval $2 \ast k_{trad} \leq k_1 \leq 30 \ast k_{trad}$.

According to one embodiment there is one motion reversing mechanism on each side of the counterweight. According to one example, said counterweight is arrangeable at a position located between said first counterweight position and said second counterweight position from which position said counterweight is movable a first distance extending in said first axial direction without actuating said at least one spring-action arrangement, and wherein said vibration reduction arrangement further comprises:

a first end surface arranged adjacent to said first counterweight position, and
a second end surface arranged adjacent to said second counterweight position; and
said at least one motion reversing mechanism comprises a first motion reversing mechanism and a second motion reversing mechanism, and the at least one spring action arrangement of said first motion reversing mechanism is arranged between said counterweight and said first end surface,
and the at least one spring action arrangement of said second motion reversing mechanism is arranged between said counterweight and said second end surface.

According to one example, said first spring action arrangement is attached to said first end surface, and said first spring action arrangement is arranged to receive said counterweight when in motion towards said first counterweight position.

According to one example, said second spring action arrangement is attached to said second end surface, and said first spring action arrangement is arranged to receive said counterweight when in motion towards said first counterweight position.

According to one example, said first spring action arrangement is attached to said counterweight, and said first end surface is arranged to receive said first spring arrangement when said counterweight is in motion towards said first counterweight position.

According to one example, said second spring action arrangement is attached to said counterweight, and said second end surface is arranged to receive said second spring arrangement when said counterweight is in motion towards said first counterweight position.

According to one example, said first spring action arrangement is arrangeable at a position located between counterweight and said first end surface from which position said first spring arrangement is movable a first distance extending in said first axial direction without actuating said first spring-action arrangement.

According to one example, said second spring action arrangement is arrangeable at a position located between counterweight and said second end surface from which position said second spring arrangement is movable a first distance extending in said first axial direction without actuating said second spring-action arrangement.

According to one example, wherein said first spring action arrangement comprises a first spring action member, which first spring action member is biased, and/or wherein said second spring action arrangement comprises a second spring action member, which second spring action member is biased.

According to one example, wherein said first spring-action arrangement have spring action members arranged in series or in parallel in said first axial direction; a first spring-action member having a first spring coefficient within the interval $-k_{trad} \le k_1 \le k_{trad}/2$ and $k_1 \ne 0$, the second spring-action member having a second spring coefficient within the interval $2*k_{trad} \le k_2 \le 30*k_{trad}$, the second spring member is not prestressed. The first and/or the second spring action member may also comprise a set of spring actions members, said set of spring action members having a resulting spring coefficient according to the above $k_1$ or $k_2$, respectively; and none of the second spring action members are prestressed.

Alternatively, said first spring-action arrangement have spring action members arranged in series or in parallel in said first axial direction; a first spring-action member have a first spring coefficient within the interval $-k_{trad} \le k_1 \le k_{trad}/2$ and $k_1 \ne 0$, the second spring-action member have a second spring coefficient within the interval $k_{trad}/5 \le k_2 \le 30*k_{trad}$, the second spring member is prestressed. The first and/or the second spring action member may also comprise a set of spring actions members, said set of spring action members having a resulting spring coefficient according to the above $k_1$ or $k_2$, respectively; and at least one spring action member, belonging to said set of spring action members having a resulting spring coefficient $k_2$, is prestressed.

According to an exemplary embodiment, the machine further comprising a second motion reversing mechanism located at the second counterweight position, and arranged to receive the moving counterweight as well as reversing the direction of motion of the counterweight,
wherein the second motion reversing mechanism comprises
a first spring-action member;
or
a first spring-action member and a second spring-action member arranged in series such that one of the spring-action members is attached to the counterweight; the first spring-action member having a first spring coefficient and the second spring-action member having a second spring coefficient, which is different from the first spring coefficient.

Alternatively, the second motion reversing mechanism may comprise a non-linear spring with a weaker section and a stiffer section, wherein the weaker section is in contact with the counterweight. Examples of non-linear springs may comprise coil springs with a diameter that changes as a function of the length of the non-linear spring, which may e.g. result in a conical spring shape.

According to an exemplary embodiment, the gap or the first distance is at least 20%, or at least 40%, or at least 60% or at least 70% or at least 80% or at least 90% of the maximum counterweight displacement distance. Additionally, or alternatively, the gap is at the most 90% or at the most 95% at the most 97% at the most 99% of maximum counterweight displacement distance. In other words, the gap introduces a distance where the counterweight is not subjected to any spring-action force. For example, the system may be designed with spring-action members, such as air cushions.

According to an exemplary embodiment, which features at least two spring-action members connected in series, wherein the first spring-action member being arranged closest to the counterweight, the first spring coefficient is lower than the second spring coefficient, and wherein the first spring coefficient applies to a distance corresponding to at least 10% or at least 15% or at least 20% or at least 25% of the maximum counterweight displacement distance and the second spring coefficient applies to the remaining distance within the maximum counterweight displacement distance. Furthermore, the unactuated length of the first action member may correspond to at least 20%, or at least 40%, or at least 60% or at least 70% or at least 80% or at least 90% of the maximum counterweight displacement distance.

According to an exemplary embodiment, the first spring coefficient is at least 50%, or at least 60% or at least 70% lower than the second spring coefficient.

According to an exemplary embodiment, the impact machine further comprises hammer element guiding means arranged to cause the hammering element to move in a linear direction between the first hammering element position and the second hammering element position, wherein the guiding means comprises an elongated cavity wherein said hammering element is arranged.

According to an exemplary embodiment, the impact machine further comprises counterweight guiding means arranged to cause the counterweight to move in a linear direction between the first counterweight position and the second counterweight position. With guiding means, the movements of the counterweight are controlled so that the travel path is always the same.

According to an exemplary embodiment, the impact receiving element is a work tool, such as a chisel, drill bit or like.

According to an exemplary embodiment, the impact machine is handheld. An efficient vibration reduction arrangement according to the invention is particularly useful for preventing a vibration transfer to a person holding the impact machine. Another advantage is that the vibrations normally only increase gradually as the working frequency of the machine tool shifts out from the damping range, which enables a user to feel and anticipate the rise in vibration, such that body injuries may be prevented. Moreover, with the vibration reduction arrangement according to this invention, it is possible to design the impact machine such that it always stays in a working frequency arrangement with low vibration amplitude of housing between 0.4 and 1 mm peak.

According to an exemplary embodiment, the impact machine is not handheld, but attached to a machine. Examples of such machines may be construction machinery, such as excavators, backhoe loaders or like. Advantages include that less vibrations are transferred to the machine and to the operator, which significantly improves the operating comfort for and reduces the mechanical wear on the machine.

According to an exemplary embodiment, the weight of the impact element corresponds to 20% to 300% of a weight of the counterweight. The purpose of the counterweight arrangement is to counteract the vibrations from the impact element. Depending on the weight and stroke length of the impact element, the counterweight and the travel path between the first counterweight position and the second counterweight position may be adjusted such that the resulting force on the counterweight is equal to the force of the hammering element. Consequently, a counterweight with a weight of less than 100% of the hammering element's weight gives the advantage of a possible reduction in the overall weight in the impact machine. On the contrary, a counterweight with a weight of more than 100% of the hammering element's weight gives a better flexibility to mount the vibration reduction arrangement in view of the geometric constraints of the impact machine, such as the length of the impact machine's housing.

According to an exemplary embodiment, the counterweight comprises one or more elements, evenly distributed with respect to the housing of the hammering element. By distributing the counterweight around the center movement axis of the hammering element, a higher stability is achieved to the impact machine, which also more efficiently absorbs the vibrations distributed in its housing.

According to an exemplary embodiment, the counterweight is arranged around the housing of the hammering element. In this way, the counterweight is completely distributed around the tool. By designing the counterweight as one unitary part, whereby the impact machine may be better balanced. Another advantage is that the frequency of a single unit is easier to control.

According to an exemplary embodiment, a boost of pressurized air is directed to the counterweight through the outlet hole from the impact element. The counterweight is designed in such a way that it directs the air in a direction that it creates a axial force on the counterweight, bringing it into counter phase of the hammering element in a short time and thereby reducing the vibrations. An advantage is that the vibration damping arrangement is rapidly brought into the correct working frequency and that the vibration reduction effect is achieved faster.

According to an exemplary embodiment, the vibration reduction arrangement may be enclosed in a housing. An enclosed vibration reduction arrangement may reduce the occurrence of foreign particles (dust, dirt etc.) enter the system.

According to an exemplary embodiment, the housing of the vibration reduction arrangement is a closed housing, which contains a fluid. The fluid can be air, gas a liquid. The fluid may be introduced to either reduce friction or to create a damping effect.

The force from the counterweight on the housing also creates a feed force that improves the efficiency of the machine.

Generally, all terms used in the claims are to be interpreted according to their ordinary meaning in the technical field, unless explicitly defined otherwise herein. All references to "a/an/the [element; device, component, means, step, etc]" are to be interpreted openly as referring to at least one instance of said element, device, component, means, step, etc., unless explicitly stated otherwise.

Other objectives, features and advantages of the present invention will appear from the following detailed disclosure, as well as from the drawings.

BRIEF DESCRIPTION OF THE DRAWINGS

These and other aspects will now be described in more detail with reference to the appended drawings, in which exemplary embodiments of the present invention are shown, wherein:

FIGS. 1a and 1b are diagrams illustrating the correlation between working frequency and vibration amplitude for simulated vibration arrangements.

FIG. 6 is a cross-sectional schematic view of the counterweight in FIGS. 4 and 5.

FIG. 7 is a schematic perspective of another exemplary embodiment of a counterweight according to the invention.

FIG. 8 is a cross-sectional schematic view of the counterweight in FIG. 7.

FIG. 10a shows a cross-sectional schematic view of the counterweight and its arrangement in FIG. 5

FIG. 10a shows the counterweight in FIG. 10a in a first counterweight position.

FIGS. 11a-11b show cross-sectional schematic views of other exemplary embodiment of the counterweight and its arrangement according to the invention.

FIGS. 15a-15l are schematic perspective views of other exemplary embodiments of the present invention.

FIG. 17 is a schematic perspective, of an impact machine according to a further exemplary embodiment.

FIGS. 20a to 20c are schematic perspective views of exemplary mounting positions for the vibration reduction arrangement.

DETAILED DESCRIPTION

It should be noted that the illustrated embodiments by no means limits the scope of the present invention. In particular, the motion-reversing mechanism is described and illustrated as a coil spring. However, coil springs should only be seen as a representation of a possible spring-action member. In relation to this invention, spring-action members should include any member, which is capable of elastically reversing the moving counterweight in a vibration reduction arrangement. Like features are denoted with the same reference number.

Figure 1B:
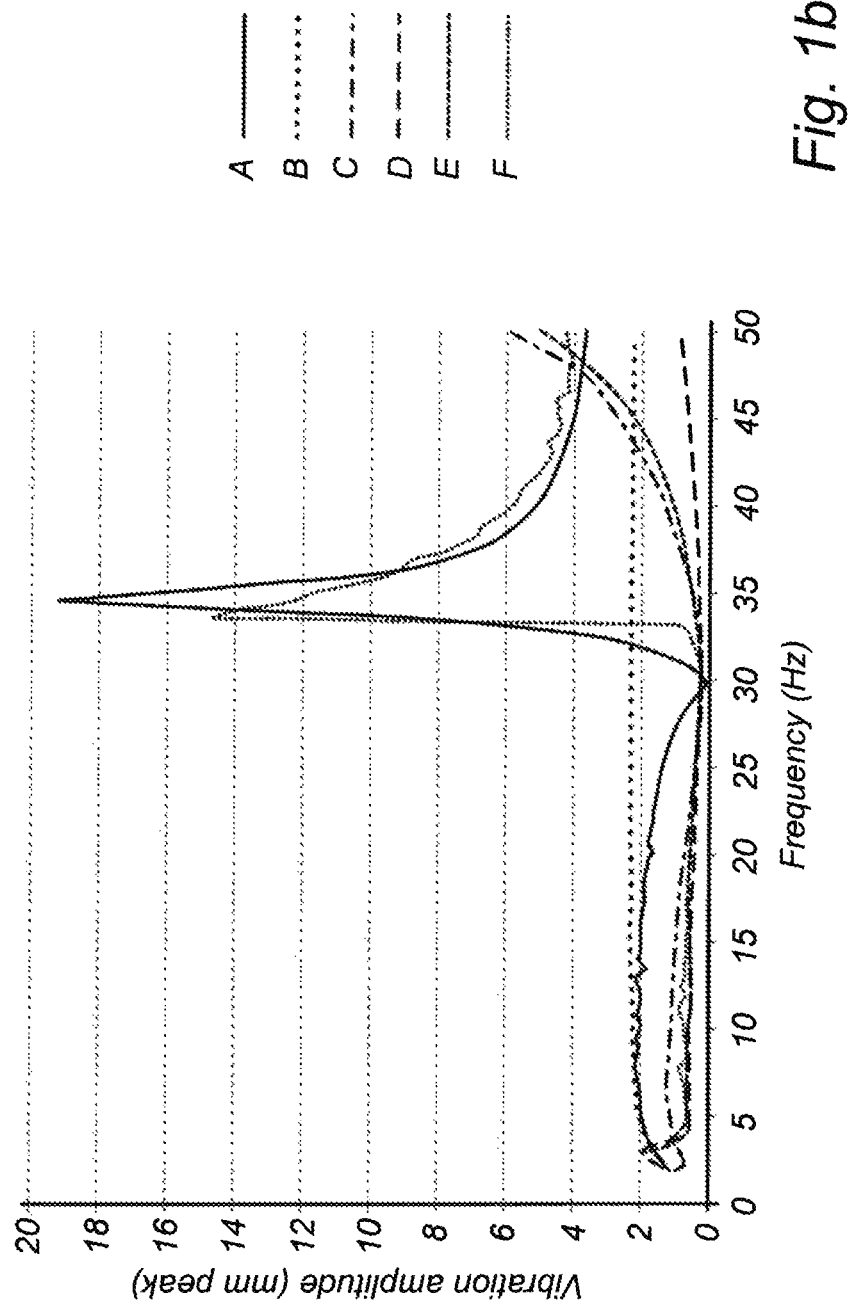

FIG. 1a and FIG. 1b show diagrams with a representative image of the correlation between a working frequency f for an impact machine and the amplitude of transferred vibrations $V_a$ to a handle or an attachment point to the impact machine. Notably, the diagrams in FIGS. 1a and 1b illustrate examples of variations in the vibration reduction effect for a machine with several different vibration reduction arrangements. The graphs were generated in the multi-body simulation program RecurDyn®, by Functionbay®. All simulations have been further validated in the simulation software Matlab®, by MathWorks®, and also verified by laboratory test with mechanical components.

Figure 2A:
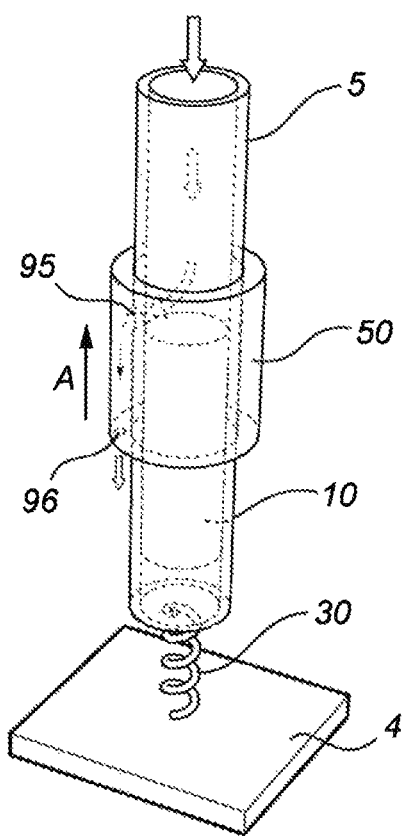
FIGS. 2a and 2b are schematic views of exemplary impact machine embodiments in perspective and in cross section respectively.
Figure 2B:
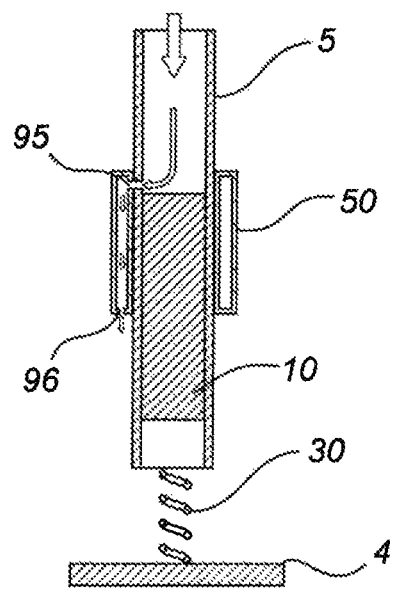

FIGS. 2a and 2b show a schematic view of the simulation model in the program RecurDyn® that was designed for the simulations according to FIGS. 1a and 1b. The schematic model comprises a movable hammering element 10, a counterweight 50, a hammering element housing 5 and an impact receiving element 30 in contact with the ground 4. The counterweight is movable in a first axial direction A. The impact receiving element is given the function of a spring, as it provides a resilient movement in relation to the surface and simulate the effect of a work tool. The impact receiving element may also be referred to as an implement.

Now referring to FIG. 1a. In the simulations, the spring characteristics of the counterweight 50 are applied as forces acting on the housing 5. For an instance in time where the counterweight 50 is at its respective end position, the force acting on the housing 5 is $F_{CW}=kx+c\dot{x}$ from the counterweight, and $F_{HE}=m\ddot{x}$ is the force from the hammering element. The force $F_s$ from the impact receiving element 30 is determined by $F_S=Kx+C\dot{x}$. $F_{HE}$ and $F_{CW}$ are being arranged in the opposite directions.

The following parameters were entered in the program:
Spring coefficient for counterweight 50 set to: k=300 N/mm
Damping coefficient counterweight 50 set to: c=0.1 N*s/m
Spring coefficient against surface 4 set to: K=0.5 N/mm
Damping coefficient against surface 4 set to: C=1001 N*s/m
Weight of hammering element housing 5 set to: M=3000 gram
Weight of counterweight 50 set to: m=1000 gram
Weight of hammering element 10 set to: H=300 gram
Amplitude of hammering element 10 set to: s=60 mm peak to peak, sinus-shaped.
Variable simulation parameter: frequency (f) and gap The distinctive simulation curves according to FIG. 1 were achieved by entering the following specific constraints:
$C_{gap}$: Gap $D_1$ is fixed to 15 mm.
$C_{no\ gap}$: Gap $D_1$ is fixed to 0 mm
$C_{locked}$: Counterweight 50 is fixedly connected to the housing 5 of the hammering element.

A first simulation $C_{locked}$ illustrates the vibrations of the hammering element housing 5 under condition that the counterweight is locked/immovable in relation to the housing of the hammering element. This graphic may serve as reference to the other two configurations in the diagram, as it illustrates an un-dampened impact machine. As the impact machine is shifted through the operating range of 2 Hz to 50 Hz, the vibration amplitude $V_a$ plateaus just above 2 mm after 10 Hz in this example.

A second simulation $C_{no\ gap}$, illustrates the vibrations under condition that the counterweight is movable in relation to the hammering element. The $C_{no\ gap}$, is a typical illustration of the efficiency from a "narrow range vibration reduction arrangement". As the working frequency of the impact machine is increased, the vibration amplitude $V_a$ gradually decreases. The vibration reduction effect continues, whereby a minimum vibration amplitude $V_a$ equals 0.1 and is achieved at 30 Hz. Notably, by achieving a vibration amplitude below at least 1 mm, in this example this opens up a possibility to design the total machine system which handles keep a vibration amplitude that meets the health and safety standards. 1 mm is just given as example when illustrating how different parameters affect the systems. If desired this limit can be set to another value for example to meet health and safety standards. For this configuration $C_{no\ gap}$, the useful frequency range of the impact machine thus lies within the range between the points D to F (27 to 32 Hz), which corresponds to a narrow interval of only 5 Hz. Moreover, a variation of 5 Hz is very a narrow interval in relation the normal/typical variations of impact machines' working frequency. Additionally, due to the steep increase in vibration at point F, where a considerable amplification of the vibration occurs, a safety zone is required, whereby the useful working frequency range is even further reduced to the range between points D to E (27 to 30 Hz), corresponding to an even narrower interval of 3 Hz. Another draw-back with this configuration is that, without safety zone and as the machine shifts out from the useful frequency range, the vibration amplitude drastically changes in such a way that a user of the impact machine would be unprepared to the sudden increase in vibrations from the impact machine.

A third simulation $C_{gap}$ illustrates a vibration reduction effect according to an embodiment of the present invention. The counterweight is movable in a counter-phased manner in relation to the hammering element and travels through a distance/gap where the counterweight is freely movable and Where the springs used for deaccelerating the counterweight are unattached. A significant change in the graphic is thus visible, whereby the vibration amplitude is first increasing then transitioning to a significantly lower level than for the two previous examples. Compared to the draw-backs of the configuration $C_{no\ gap}$, the illustrated embodiment of the present invention $C_{gap}$, achieves an efficient vibration reduction effect throughout a substantially larger frequency range between the points B and C (6 and 49 Hz), when a reduction of 1 mm is required. Another benefit from the embodiment of the present invention is that even if the vibration amplitude increases outside the useful frequency range, the increase is rather moderate Such that it may be anticipated by a user of the impact machine, whereby a safety zone is not needed.

FIG. 1b illustrates a second set of simulations based on essentially the same impact mechanism parameters as in the example illustrated in FIG. 1a. The goal of the second set of simulations was to see how variations of gap length, spring coefficients and prestressing/biasing would affect the vibration, in order to better optimize the benefits.

For reference, there are two simulation setups A and B which are equal to $C_{no\ gap}$ and $C_{locked}$ hence they respectively illustrate a more traditional setup with no gap and a setup with a locked counterweight. Traditionally, the spring has been designed based on the correlation to the counterweight's resonance frequency given by the equation $$f_{res} = \frac{1}{2\pi}\sqrt{\frac{k_{trad}}{m}}$$

For setups C and D, a gap of 10 mm for setup C and a gap of 15 mm for setup D have been introduced. Furthermore, the spring coefficient k has been increased compared to the traditional setup so that it is approximately 3 times higher for setup C and almost 10 times higher for setup D in order to give optimum performance at 30 Hz.

For setups E and F pretension loads for the spring action members were added to the simulation. Both setup E and F have a gap of 15 mm, similarly to setup D. Setup E was setup with a prestressed load of 300 N and the spring coefficient was roughly 3 times higher than for setup A. Simulation F was setup with a prestressed load of 400 N and the spring coefficient was roughly 4/5 of the traditional setup used in A. The results from the simulation set show promising results for all four setups C-F. Setup C in this second simulation set lies below 1 mm peak in the frequency range 14 Hz-37 Hz and is more efficient than setup B all the way up to 44 Hz. Setup D has a very small peak, <2 mm, below 5 Hz, but lies below the 1 mm level up to 60 Hz, giving an effective range from 4 Hz to at least 60 Hz. Setup E has a small peak at 3 Hz similar to setup D and then shows an effective range below the 1 mm limit to 39 Hz. Setup F has a steep increase in amplitude at 34 Hz in a similar manner to the traditional no gap setup A. However, setup F has an effective range almost down to 4 Hz. The reason for the drastically increased frequency stability is due to the fact that increased amplitude of the counterweight gives an increase in the resonance frequency as a result of the strong nonlinearity. This is believed to make the counterweight adjust its amplitude so that the resonance frequency will be optimized for the disturbing frequency. Including safety zones that should still be in the range 5 Hz to 30 Hz. The expression for the resonance frequency for the systems without pretension load and infinite weight of the housing is then given or may be selected by $$f_{res} = \frac{1}{2D_1 + 2\pi b}\sqrt{\frac{k}{m}}$$

Where b corresponds to the compressed distance of the spring. From the equation it can be seen that when the amplitude increases and b with it, the resonance frequency is increased. Preferably, the gap $D_1$ and spring coefficient k can be chosen so that the resonance frequency is close to the working frequency of the machine where the vibrations needs to be reduced. The compressed distance of the spring b is given by calculating the momentum of the impact weight that excites the system. This momentum should be the same that the spring action member absorbs from the counterweight via the endsurfaces, when the spring action member is arranged in the counterweight, and b can be calculated from that. This is a good approximation for a well functioning system with low vibration amplitude of the housing.

Setups E and F showed that advantages can be achieved by prestressed loads on the springs. Setup E has the same spring coefficient as used in setup C, but a gap of 15 mm. The vibration peaks are almost 0.5 mm lower for setup E at 14 Hz, where setup C crosses the 1 mm limit.

A prototype machine was constructed to test the concept with tuned weight damper. The prototype was based on a redesigned construction of Atlas Copco KV 434. The tests performed are described in the following section. The prototype was constructed according to one embodiment of the invention and the test parameters during the test were:

Counterweight weight 930 g
Hammering element housing weight 4200 g

The tests were performed with three setups, in one setup the prototype did not have a counterweight, this setup should represent a reference machine and is called only "No counterweight". A second setup had a counterweight which was blocked so that it does not move relative to the prototype's housing. Essentially, the blocked counterweight adds weight to the prototype, which added weight dampens the vibrations. For the third setup the counterweight was free to move in reverse phase to the hammering element. The following settings were implemented for the spring action to the counterweight.

Spring stiffness 100 000 N/m
Gap 15 mm

In order to achieve effective vibration reduction the machine was divided into two functional parts: first a suspended weight that contains the impacting mechanism and a tuned vibration absorber comprising the counterweight, and second a housing with the interface to the operator. Vibration isolation between the suspended weight and the housing is applied in the axial, radial and rotational direction in order to handle the vibrations that still remain after the tuned absorber. Care had to be taken not to compromise with the ability to accurately control the machine. The vibrations on the handles of the machines were measured in a test rig, which yielded the same characteristics as described in ISO 8662-5. A three axis Dytran 3053B2 accelerometer with mechanical filter was used to measure the vibrations on the handles. The handle acceleration is measured in weighted vector sum hand-arm acceleration and the signals were analyzed in Labview. Vibration measurements on the hammering element housing were done with a laser displacement sensor, Contrinex, LAS-5050L, and the counterweight was measured with stroboscopic light and a steel scale. The tuned vibration absorber produced a reduction of 68% from 8.4 to 2.7 m/s2 on the handle. The stability of the operation of the tuned vibration absorber was tested by varying the air pressure to the machine from 3 to 7 Bar as well as varying the feed force from −110 N to 450 N. It was found that the vibration level varied between 2.2 and 3.6 m/s2 on the handle. An analysis of the behavior of the counterweight and how it affects the vibrations of the suspended weight was also carried out. The suspended weight displacement was 1.9 mm peak to peak while the counterweight displacement was 30.4 mm peak to peak. From those results it can be calculated that the generated peak force from the counterweight reached 684 N providing the movement of the weight is sinusoidal. For reference, the suspended weight displacement with the counterweight removed was 6.4 mm peak to peak, and 5.2 mm with the counterweight blocked. The general behavior of the vibration absorber corresponds well to the simulation with respect to a high stability of the vibration reduction over a wide frequency range and varying feed force which is the main issue. The discrepancy is mainly due to the simplified model of the excitation force which is represented as a sinusoidal force in the simulation model.

Figure 3A:
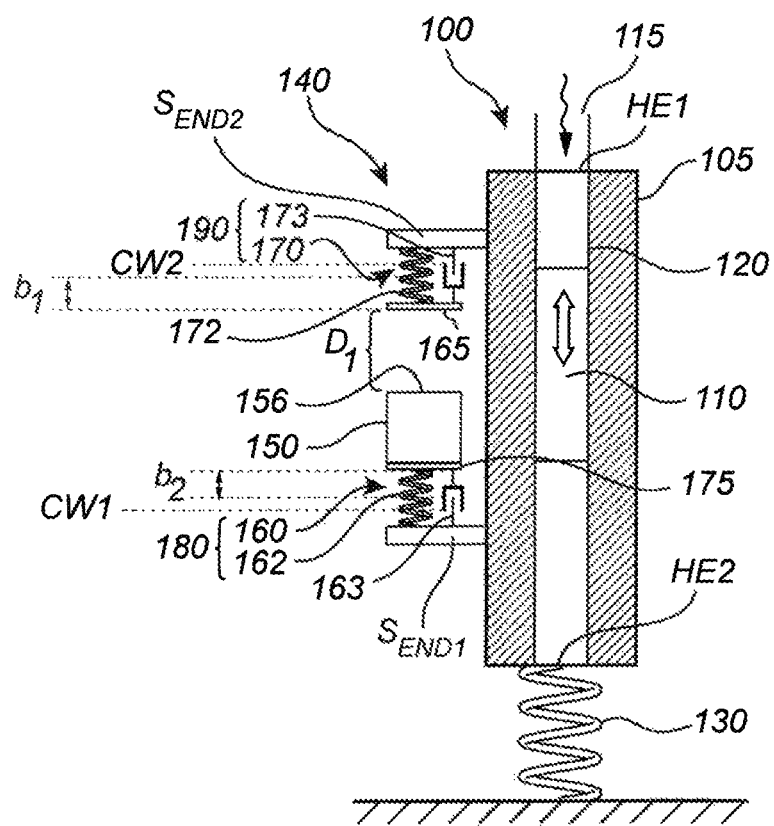
FIGS. 3a and 3b are schematic cross-sectional views of exemplary impact machine embodiments.

FIG. 3a illustrates an impact machine 100 which comprises a movable hammering element 110 arranged inside a housing 105. The hammering element 110 is displaceable between a first hammering position HE1 and a second hammering position HE2 by actuating means 115. Examples of actuating means 115 may include a pneumatic, an electric, combustion engine or a hydraulic blow force. An implement 130, such as a work tool is attached to the impact machine 100 in such a way that the blow force from the movable hammering element 110 is transferred to the implement 130 in the second hammering element position H2. A vibration reduction arrangement 140 is attached to the housing 105. The vibration reduction arrangement 140 comprises a counterweight 150, which is displaceable between a first counterweight position CW1 and a second counterweight position CW2 in response to the hammering action of the hammering element 110. In the first CW1 and the second CW2 counterweight positions, spring-action arrangements 160, 170 are arranged to receive and reverse the motion of the counterweight 150. In the illustrated example, the first spring-action arrangement 160 and a second spring-action arrangement 170 each consist of one spring action member 162, 172. The spring-action arrangements 160, 170 are limited in their axial movement by a first $S_{end1}$ and a second end-surface $S_{end2}$ which are parts of a housing of the vibration reduction arrangement 140. In the illustrated example, the spring-action member 162 is attached to the first end-surface $S_{end1}$ and the second spring-action member 172 is attached to the second end-surface $S_{end2}$. When the vibration reduction arrangement 140 is in use, the spring-action members 162, 172 are compressed with a compression length $b_1$ and $b_2$ respectively. The compression lengths $b_1$ and $b_2$ can be varied depending on the force applied to the spring-action members 162, 172. The maximum compression length is achieved under operating conditions when the counterweight 150 reaches the first CW1 or the second counterweight position CW2. Specifically, normal operating conditions are defined at the rated power and according to applicable ISO standards if any, such as ISO 8662-2 for hand-held portable power tools. In the embodiment illustrated in FIG. 3a, provided that the machine is at rest, a spring-action member 160 is arranged with its contact endpoint 165 at a distance $D_1$ from a contact surface 156 of the counterweight 150. In relation to FIG. 3a, the first counterweight position CW1 and the second counterweight position CW2 define the maximum counterweight displacement distance. In these positions CW1, CW2 the spring-action members 160, 170 are compressed. In addition, damping units 180, 190 with a damping ratio of less than 0.3 are arranged in parallel with each spring-action arrangements 162, 172. This may be a separate reduction component, or a natural reduction effect from the spring-action member itself.

In particular, the damping ratio can be determined by the following relationship:

$$\zeta = \frac{c}{2\sqrt{mk}}.$$

Figure 3B:
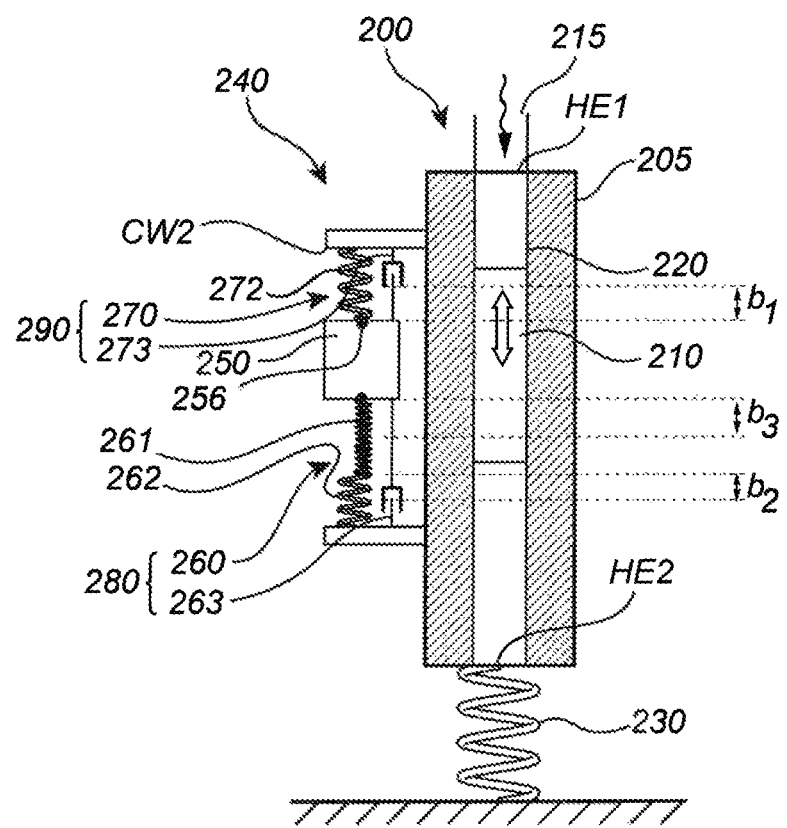

Wherein:
$\zeta$: Damping ratio
m: weight
c: damping coefficient
k: spring coefficient FIG. 3b illustrates another embodiment of a vibration reduction arrangement, which is arranged as the embodiment presented in FIG. 3a, except from that the distance $D_1$ has been replaced by a spring-action member 261 with a lower spring coefficient than a second spring-action 262 member. The spring-action member 272 is not fixedly connected to the counterweight 250. Had the spring-action member 272 been fixedly connected to the counterweight, the spring characteristics of this spring-action member 272, would reduce the effect of the weak spring and thus the vibration dampening effect. This combination of spring-action members provides for a discontinuous change in the force acting upon the counterweight 250. In addition, damping units 263, 273 with a damping ratio of less than 0.3 may be arranged in parallel with each spring-action arrangement 260, 270. This may be a separate reduction component, or a natural reduction effect from the spring-action member itself. Alternatively, the spring action member at said second counterweight position may be attached to the counterweight, but not to said second end surface ($S_{end2}$)

Returning to FIGS. 2a and 2b for reference, a means of initiating the reversed phase movement of the counterweight according to one exemplary embodiment will be described. As the hammering element 10 may be displaced by means of for example pneumatic actuation or hydraulic actuation there is a fluid flow into the housing 5, preferably flowing into the distal end of the housing relative the implement 30. The housing may be provided with an outlet 95 arranged in the wall of the housing 5 so that as the hammering element 10 is displaced towards the implement 30 by the fluid, the outlet 95 is exposed. The pressurized fluid will be conducted through the outlet 95, which is preferably arranged at a location where it opens into the counterweight 50 at least when it is in its neutral position. According to this exemplary embodiment the counterweight is arranged with a chamber conducting the pressurized fluid to a nozzle 96 which is preferably arranged at the proximal end of the counterweight, relative to the implement. The pressurized fluid will bring the counterweight into an initiated counter-phased movement by a boost of fluid through the nozzle 96. While a flow arrangement and boost according to this exemplary embodiment is not essential for the impact machine to work results from tests have shown that the boost does reduce the time it takes for the counterweight to reach the desired counter phased movement. The flow is preferably a gas flow and most preferably an air flow, as this may be released freely. However, it may be possible to arrange a recirculation system so that other fluids may be used. It should be noted that there may be more than one outlet 95 and/or more than one nozzle 96, for example to change the flow rate or to direct or balance the boost. Furthermore, in an exemplary embodiment where the impact machine is electrically actuated the reversed phase movement of the counterweight may be initiated by for example an electromagnetic actuator.

Figures 4, 5:
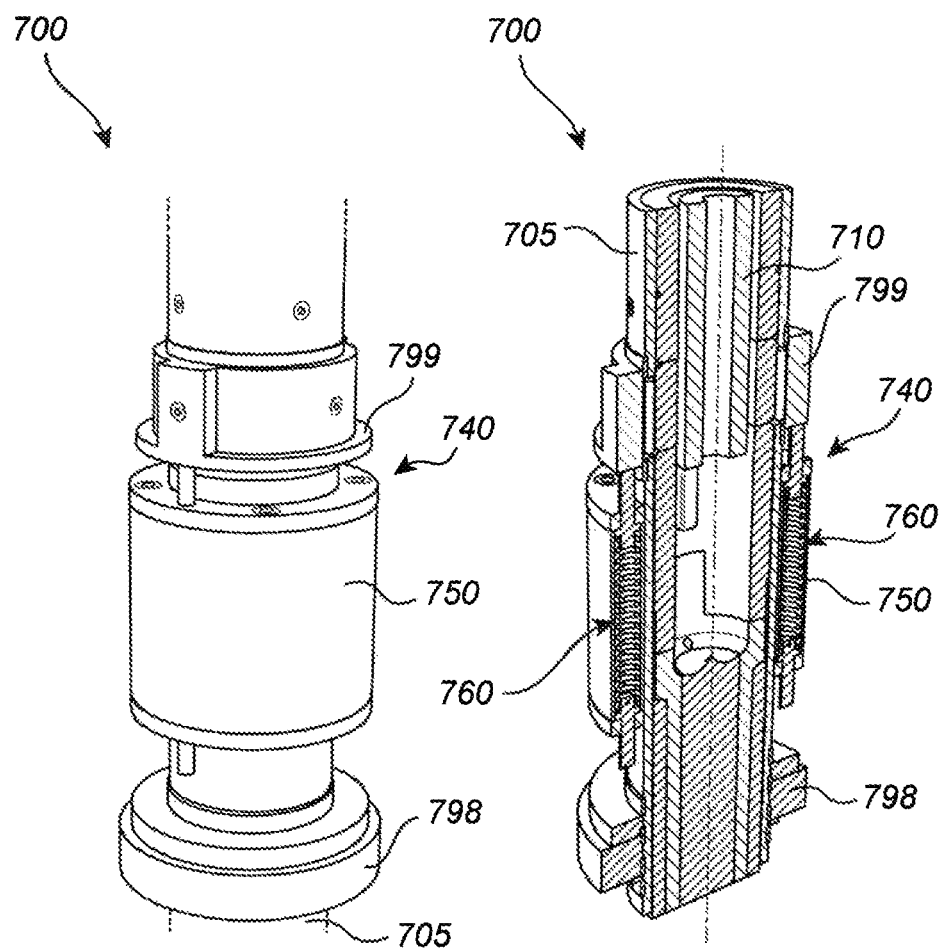
FIG. 4 is a schematic perspective of a part of the impact machine according to the invention.
FIG. 5 is a cross-sectional schematic view of the part of the impact machine in FIG. 4.

FIGS. 4 and 5 show a part of an impact machine 700, similar to the one in FIG. 3a comprising a hammering element housing 705 with a longitudinally movable hammering element 710 displaceable between a first hammering position and a second hammering position by actuating means (not shown) such as a pneumatic force, a hydraulic force, an electric engine or a combustion engine. Around the hammering element housing 705 is a vibration reduction arrangement 740 comprising a counterweight 750 and the counterweight 750 is being displaceable in a first axial direction A between a first counterweight position CW1 and a second counterweight position CW2 in response to the hammering action of said hammering element (not shown, however shown and described in regard to FIG. 10a). In the counterweight 750 two spring-action arrangements 760 are arranged, and the counterweight 750 is movable a first distance $D_1/2$ from the centre position extending in said first axial direction A without actuating the spring-action arrangements 760. The counterweight is also movable $D_1/2$ in the opposite direction without actuating the spring-action arrangements 760 (see FIG. 10a). According to this example the counterweight 750 has a cylindrical shape and the two spring-action arrangements 760 are arranged at equal distances from each other around the counterweight 750. The counterweight is not limited to have only two spring-action arrangements 760, there may be more, for example four spring-action arrangements 760, or any integer in the interval of 1-20, which are equally distributed around the hammering element housing 705. A first disc 798 comprising a first end surface ($S_{END1}$) is attached to said housing and arranged adjacent to said first counterweight position (CW1) and a second disc 799 comprising a second end surface ($S_{END2}$) is attached to said housing and arranged adjacent to said first counterweight position (CW2), see FIG. 10a and the related description, and when said spring action arrangement 760 engages said first end surface ($S_{END1}$) or said second end surface ($S_{END2}$) the spring-action arrangements (760) are being compressed.

FIG. 6 shows a cross-section of the counterweight 750 with its spring-action arrangements 760 in perspective. The counterweight 750 is not limited to having a cylindrical shape.

FIG. 7 and FIG. 8 show an alternatively shape where the counterweight 750 has an outer surface which approximates a truncated ellipse, i.e. it has cross-section perpendicular to said first axial direction which approximates a truncated ellipse. In more detail, a truncated ellipse is an ellipse where a section of the longest side has been cut off such that it is flat. In other words, it has one or two flat sides 751, which each is positioned on the longest side of the somewhat elliptical shaped counterweight so that the it gets it truncated shape. This is advantageous, if for example, there is limited space when using the impact machine.

Figure 9:
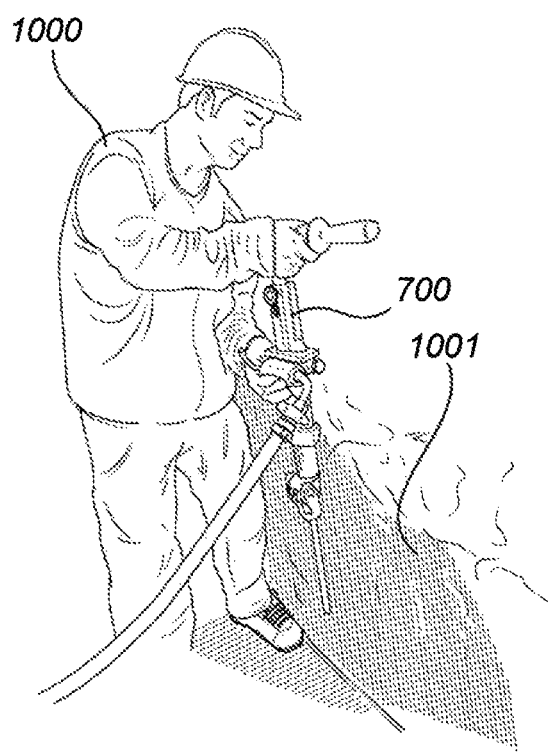
FIG. 9 shows the impact machine according to the invention in use.

FIG. 9 shows such a situation. The user 1000 has to remove material with the impact machine 700 from a stone wall 1001 and part of the stone wall 1001 is in the way. By having a flat side on the counterweight the user can get closer to the stone wall 1001 with the impact machine 700.

FIG. 10a shows a schematic cross-section of the impact machine 700 and the counterweight 750 in FIG. 5. The vibration reduction arrangement 740 is attached to the housing 705. The vibration reduction arrangement 740 comprises a counterweight 750, which is displaceable between a first counterweight position CW1 and a second counterweight position CW2 in response to the hammering action of the hammering element (not shown).

Furthermore, the vibration reduction arrangement 740 has a motion reversing mechanism 720, comprising a first end surface $S_{END1}$ which is located adjacent to the first counterweight position CW1 and a second end surface $S_{END2}$ which is located adjacent to the second counterweight position CW2. Here, the first end surface $S_{END1}$ is part of the first disc 798 and the second end surface $S_{END2}$ is part of the second disc 799.

The first end surface $S_{END1}$ and the second end surface $S_{END2}$ are located adjacent to the first CW1 and second counterweight position CW2 respectively, so that they are longitudinally opposite each other. Alternatively to the first and second discs 798, 799 the first $S_{END1}$ and second end surfaces $S_{END2}$ are formed on the housing 705. The counterweight 750 may comprise at least one cavity 755 and is provided with one or more openings 752 facing the first counterweight position CW1 and/or the second counterweight position CW2, respectively. The cavity is normally not filled with oil or other liquids for damping purposes. Oil can however be used for lubrication purposes. Each opening 752 runs from the at least one cavity 755 to an outer surface, i.e. outer surfaces 756, 757 which on the counterweight 750 is the respective surface proximal to the respective counterweight position CW1, CW2. Inside the counterweight 750 two spring-action arrangements 760, are provided. A first 780 and a second projecting member 790 are arranged adjacent to the spring action arrangement 760 on opposite sides of the spring action arrangement 760. In the embodiment illustrated in FIG. 10a the projecting members 780, 790 are fixed to the spring action arrangement 760 but the connection may also be a non-fixed surface abutment. The spring action arrangement 760 is centered and biased between the projecting members 780, 790 and the projecting members 780, 790 are formed so that they are longitudinally displaceable inside the counterweight 750, with a portion 753 of the projecting member 780, 790 extending through the openings, projecting beyond the outer surfaces 756, 757 towards the respective end surface $S_{END1}$, $S_{END2}$. On the inside of the counterweight 750 restricting means 796 are arranged comprising at least one retaining surface 794. The projecting member 780, 790 each further comprises a flange 797. The retaining surface 794 restricts the motion of said flange 797 in the first axial direction (A) or in a direction opposite thereto, respectively.

The embodiment illustrated in FIG. 10a shows the projecting members 780, 790 which extend the same length in the direction of the respective end surface $S_{END1}$, $S_{END2}$. However, each projecting member 780, 790 may be formed with an individual extension length, for example to provide a non-linearity. Relative to the counterweight 750, the projecting member 780, 790 comprises an engaging surface 785 at the distal end. The engaging surfaces 785 of each projecting members 780, 790 are contacting surfaces which each contacts the respective end surfaces $S_{END1}$, $S_{END2}$ and the engaging surfaces 785 may hence be named contacting surfaces 785. The counterweight 750 is shown as being arranged in the middle between the first counterweight position CW1 and the second counterweight position, and there is a total gap having a distance D1 between the engaging surfaces 753 of the projecting members 780, 790 which are comprised in the counterweight 750 and the respective end surfaces $S_{END1}$, $S_{END2}$ between which the counterweight 750 is movable. Hence, there is a gap, i.e. a distance of $D_1/2$ between the engaging surface 753 of the projecting member 780 and the end surfaces $S_{END1}$ and a second gap of $D_1/2$ between the engaging surface 753 of the projecting member 790 and the end surfaces $S_{END2}$. When in use the counterweight 750 is movable between the first CW1 or the second counterweight position CW2 in reaction to the movement of the hammering element, and consequently the movement of the housing 705 may be reduced. For example, as the counterweight 750 approaches the first counterweight position CW1 the engaging surface 785 of the projecting member 780 engages with the first end surface $S_{END1}$ and compresses the spring-action arrangement 760, i.e. the spring-action arrangement 760 is actuated, (see FIG. 10a') the counterweight continues towards $S_{END1}$ until it reaches its turning point where at the motion of the counterweight 750 is reversed. In FIG. 10a' the counterweight is in the first counterweight position CW1 and when said counterweight 750 is arranged in said first counterweight position CW1 said engagement surface 785 and said first end surface $S_{END1}$ are pressed against each other, said engagement surface 785 is displaced relative a center of gravity of said counterweight compared to when said counterweight is arranged in a position where said engagement surface 785 and said first end surface $S_{END1}$ are separated from each other (as in FIG. 10a), and said at least one spring-action arrangement 760 is actuated.

When the counterweight 750 is in the first CW1 and the second CW2 counterweight positions respectively, the motion reversing mechanism 720 is arranged to receive and reverse the motion of the counterweight 750. In the illustrated example, the spring-action arrangement 760 comprises one spring action member 762. The spring-action member 762 is limited in its axial movement by a first and a second retaining-surface 794 which are parts of the counterweight 750. In the illustrated example, the spring-action member 762 is attached to the projecting members 780, 790, which when at a distance D1 from either counterweight position CW1, CW2 are retained by the first and second retaining-surface 794 so that the spring-action member 162 is pretensioned. Normally, the longer the spring action member 762 the better, as this increases the lifetime of the spring action member.

The counterweight in FIG. 10a shows two spring-action arrangements 760, one on each side of the hammering element 2. However it may be advantageous to have a higher number of thinner spring action members 762, when a small radius of the counterweight is desired.

Figure 10B:
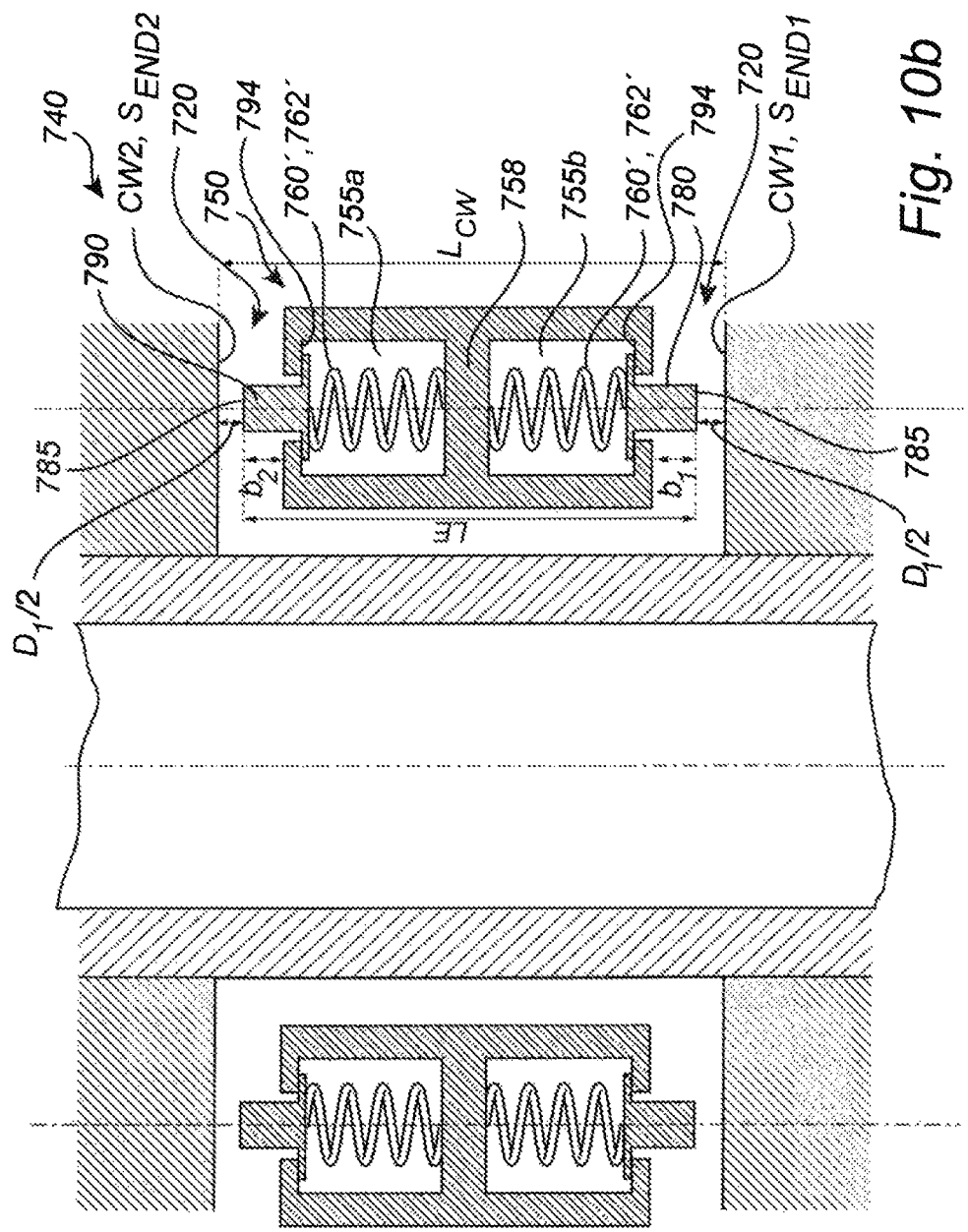
FIG. 10b shows a cross-sectional schematic view of another exemplary embodiment of the counterweight and its arrangement.

FIG. 10b illustrates a cross-section of an embodiment in which the counterweight 750 is provided with more than one cavity 755a, 755b. The cavities 755a, 755b are formed analogously to the at least one cavity illustrated in FIG. 10a, but separated perpendicularly relative to the longitudinal direction by a separating member 758 comprised in the counterweight 750. Each cavity 755a, 755b is provided with a spring action arrangement 760' comprising one or more spring action member 762' each. The one or more spring action members 762' being connected to one of the projecting members 780, 790 each. The arrangement with more than one cavity 755a, 755b provides the possibility to have individual pretension, individual spring action members 762' that may have different spring characteristics, etc. When the vibration reduction arrangement 740 is in use, the spring-action members 762' are compressed with a compression length $b_1$ and $b_2$ respectively. The compression lengths $b_1$ and $b_2$ can be varied depending on the force applied to the spring-action members 762'. Analogously, for the embodiment illustrated in FIG. 10a, the spring action member 762 is compressed with a compression length b1 at each end. The maximum compression length is achieved under operating conditions when the counterweight 750 reaches the first CW1 or the second counterweight position CW2. Specifically, normal operating conditions are defined at the rated power and according to applicable ISO standards, such as ISO 8662-2 for hand-held portable power tools or in analogy with this.

In the example illustrated in FIG. 10b, provided that the impact machine is at rest, the motion reversing mechanism 720 is arranged with its engaging surface 785 at a distance $D_1/2$ from the end surface $S_{END1}$. In relation to FIG. 10b, the first counterweight position CW1 and the second counterweight position CW2 define the maximum counterweight displacement distance.

With reference to FIGS. 10a and 10b the projecting members 780 are dimensioned in view of the openings of the counterweight 750 such that they may move longitudinally relative to the counterweight, as the spring action members 762, 762' are compressed. In the illustrated examples the projecting members 780, 790 are retained by the first and second retaining-surface 794 of the counterweight 750 when the spring action members 762, 762' are least compressed. In the counterweight positions CW1, CW2 the spring-action members 762, 762' are compressed, and the projecting members 780, 790 are dimensioned so that its engaging surfaces 785 are extending at least longitudinally beyond the first 758 and second retaining-surface 759 of the counterweight 750, or beyond the outer surface 756, 757 of the counterweight 750. The distance of the gap $D_1$ can be calculated as the distance Lcw between the first CW1 and the second counterweight position CW2 subtracted by the exterior length V or LE (maximum axial length) of the counterweight 750 including the extension of the projecting members 780 from the outer surfaces 756, 757 to the respective engaging surfaces 785.

Figure 11A:
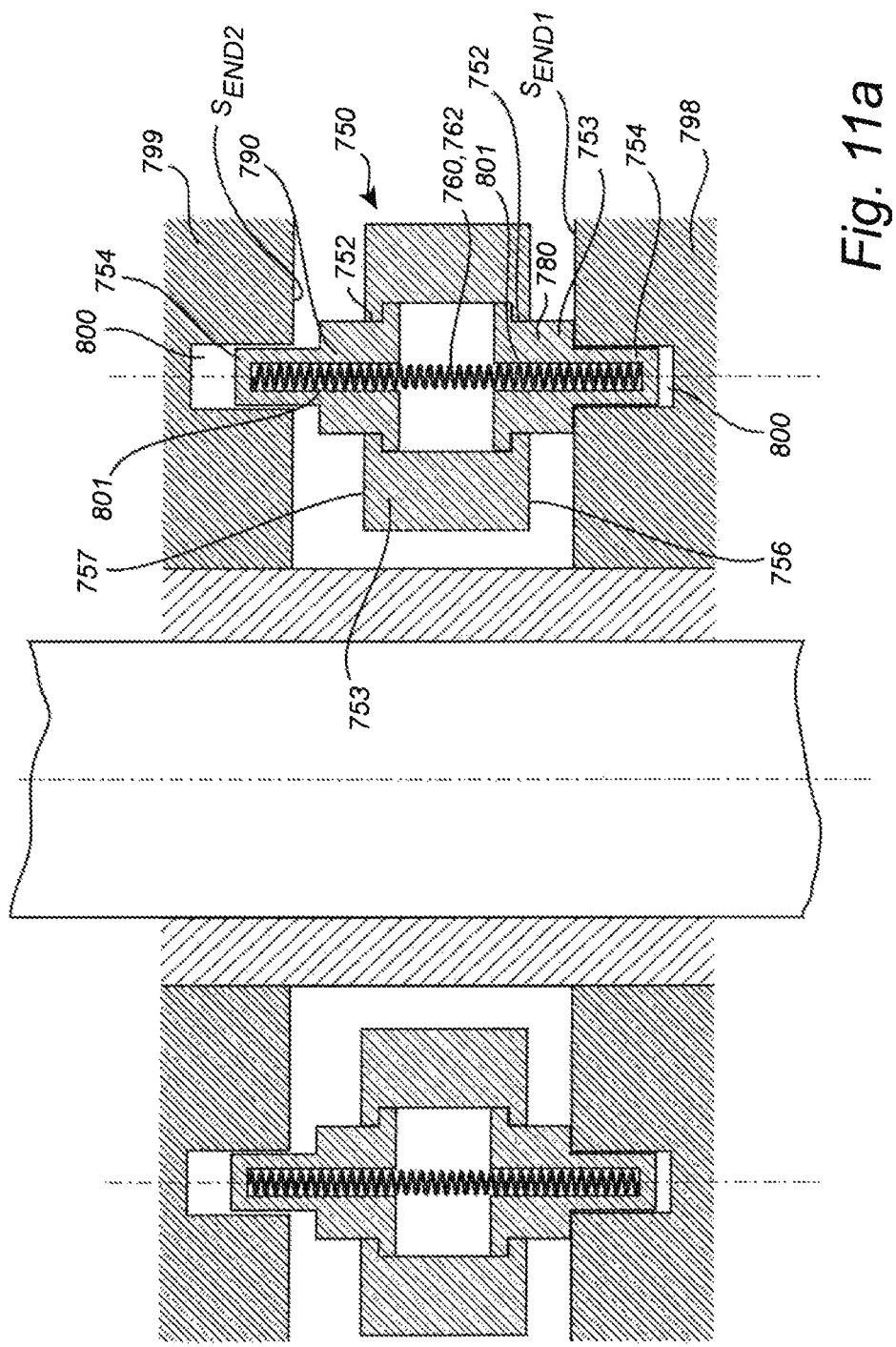

FIG. 11a shows another exemplary embodiment of the counterweight 750 which is similar to the one shown in FIG. 10a except that the projecting members 780, 790, which are formed so that they are longitudinally displaceable inside the counterweight 750, with a portion 753 of the projecting member 780, 790 extending through the openings 752 of the counterweight, projecting beyond the outer surfaces 757, 756 towards the respective end surface $S_{END1}$, $S_{END2}$, each comprises a further projecting portion 754. The projecting portions 754 are each arranged in a hole 800 of the first disc 798 and the second disc 799 respectively. When the projecting members 780, 790 are being longitudinally displaced the projecting portions 754 are longitudinally displaceable inside the holes 800. Each projecting members 780, 790 further comprises a hole 801 into which the spring action member 762 extends into. Preferably, a larger part of the spring-action members are arranged inside the counterweight. Preferably 75% is arranged inside the counterweight, more preferably 50%. The spring action member illustrated in FIG. 11a has just started to be compressed, and the counterweight 750 will continue its motion towards the turning point, which causes a compression of the spring action member. Preferably, but not necessary, before the outer surface 756 contacts the first end surface $S_{END1}$, the counterweight will have reached its turning point and the direction of motion of the counterweight will be reversed.

FIG. 11b shows another exemplary embodiment of the counterweight 750 where one of the projecting members 790 has a the same design the projecting members 790 in FIG. 11a and the other projecting member 780 has a the same design as the projecting member 780 shown in FIG. 10a, except that the spring action members 762 protrudes into an hole 802 in the projecting member 780.

The vibration reduction arrangements described above in regard to FIG. 4-11b. has to be optimized in order to get as large vibration absorbation as possible. This can be done in three steps:

Step 1: Insert the Following Input Data

Main mass (M) excluding the hammering element, the impact receiving element and the counterweight.

It is used for calculating the force in alternative two and the optimisation in the last step.

Hammering element mass ($m_{hammering\ element}$)

Counterweight mass (m)

Main operating frequency (f)

Lowest operating frequency ($f_{min}$)

Highest operating frequency ($f_{max}$)

(The frequencies are usually known from a prototype machine. ($f_{max}$) and ($f_{max}$) are consequences from tolerances in the manufacturing process, different air pressures in use and feed force and the impact receiving element Excitation in terms of momentum from hammering element movement on main mass gives the spring compression "b"

Alt 1: Calculation from hammering element mass, displacement and frequency. The compression distance (b) of the spring is determined by equation (2) below.

Alt 2: Calculation from measured vibrations on machine. The compression distance (b) of the spring is determined by equation (3) below.

The force F and the compensation (b) can be used during the optimisation in order to increase the optimisation.

Step 2: Determine Start Values for the Tuned Mass System Optimization

Select a combination of k, a and $F_0$ that gives a resonance frequency close to f by the following expression that gives an approximate resonance frequency for the tuned mass.

$$f := \sqrt{\frac{k \cdot b^2}{m \cdot (4 \cdot a + 2 \cdot \pi \cdot b)^2} + \frac{F_0 \cdot b}{8 \cdot m \cdot (2 \cdot b + a)^2}} \quad \text{Equation (1)}$$

Where:

a is the gap from the central position $F_0$ is the spring pretension b is the compression of the spring under operation at rated power. For a hammering element or main mass with a sinusoidal movement b is given by the expression.

$$b := \frac{-F_0}{k} + \sqrt{\frac{F_0^2 \cdot b}{k^2} + \frac{m_{piston}^2 \cdot v_{piston\_peak}^2}{k \cdot m}} \quad \text{Equation (2)}$$

Where piston=hammering element $$b := \frac{-F_0}{k} + \sqrt{\frac{F_0^2 \cdot b}{k^2} + \frac{M^2 \cdot v^2}{k \cdot m}} \quad \text{Equation (3)}$$

Where $V_{hammering\ element}$ is the maximum velocity of the hammering element.

The equation is based on that the hammering element and the counterweight gives equal impulse to the main mass.

Step 3: Optimization of Tuned Mass System

The intention is to find the best combination of parameters that gives the lowest vibration amplitude in the frequency interval between $f_{min}$ and $f_{max}$.

Alt 1: Optimization in simulation model. Design a simulation model that represents the mechanical system. Preferably the model of the system is built in a mathematical simulation program such as Matlab, Octave etc. or in a Multi Body Simulation program (MBS) such as Recurdyn, ADAMS etc. The parameters are then preferably optimized by he method of Design Of Experiment (DOE) or using built in optimization functions in the software packages.

Alt 2: Experimental optimization. The optimization is done by changing the parameters on a physical prototype machine This is preferably done by the method of Design Of Experiment (DOE).

The optimization gives information on the combination of play, spring rate, spring pretension, counterweight etc. Which gives the lowest value on a target function which shall be minimized. The target function is defined as the area under the vibration curves in FIG. 1b for the Main mass (M) between the lowest operating frequency ($f_{min}$) and the highest operating frequency ($f_{max}$).

The term Design of Experiments may be interpreted as: "in statistics, these terms are usually used for controlled experiments. Formal planned experimentation is often used in evaluating physical objects, chemical formulations, structures, components, and materials. Other types of study, and their design, are discussed in the articles on computer experiments, opinion polls and statistical surveys (which are types of observational study), natural experiments and quasi-experiments (for example, quasi-experimental design). In the design of experiments, the experimenter is often interested in the effect of some process or intervention (the "treatment") on some objects (the "experimental units"), which may be people, parts of people, groups of people, plants, animals, etc. Design of experiments is thus a discipline that has very broad application across all the natural and social sciences and engineering."

Figure 12:
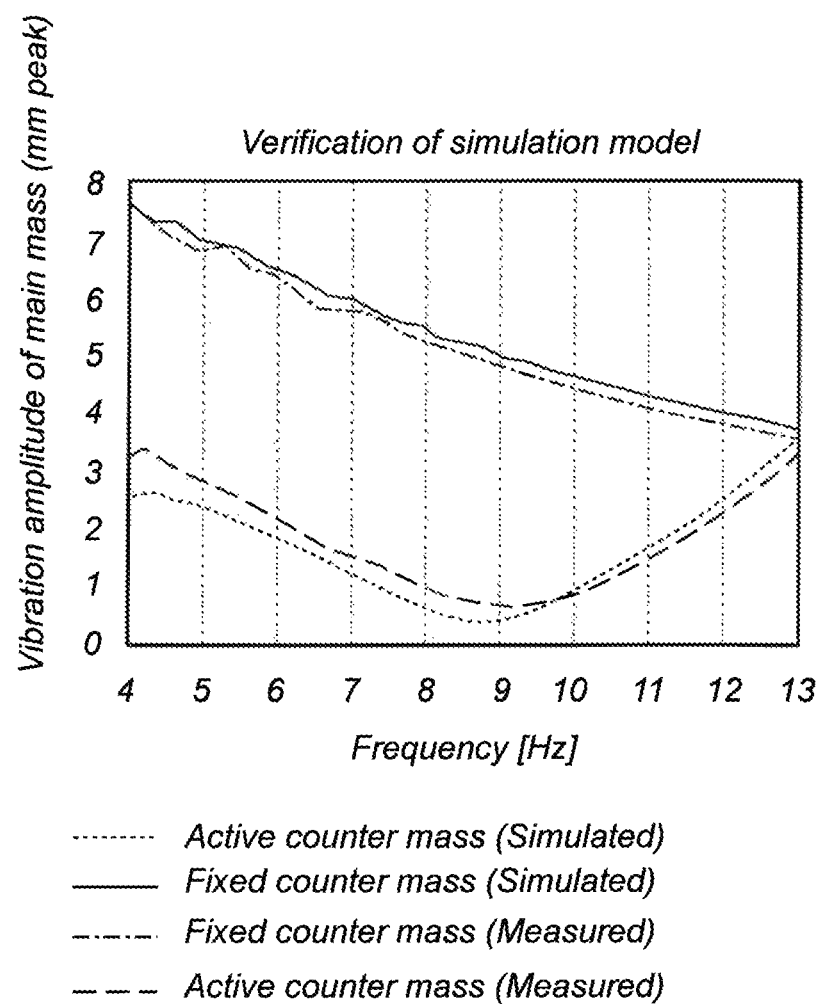
FIG. 12 shows a diagram showing verification of simulation model.
Figure 13:
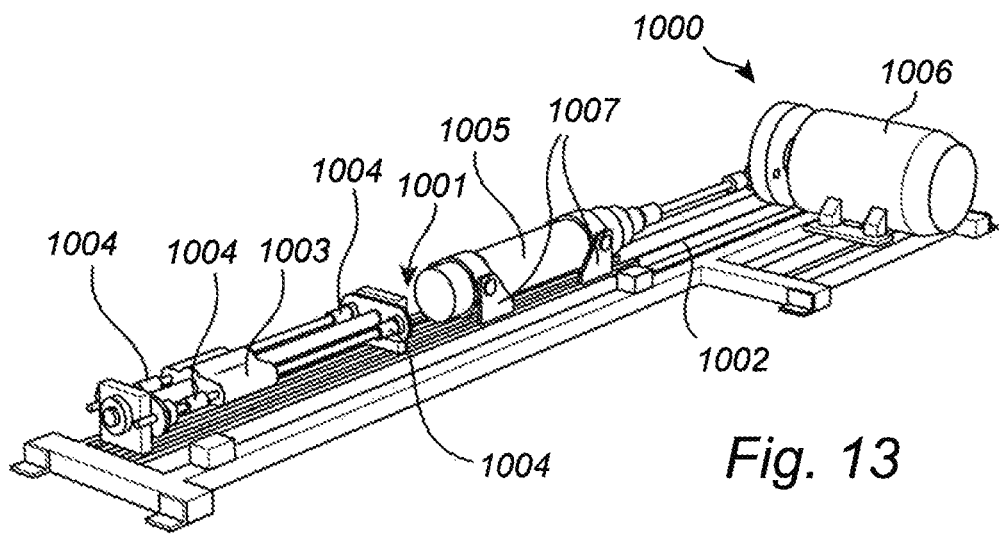
FIG. 13 shows a schematic perspective view of a test rig.

The diagram in FIG. 12 is a verification of the Matlab simulation model described above with experimental results and shows a good compliance. A test rig where designed and manufactured carefully so relevant parameters could be controlled. FIG. 13 shows the used test rig 1000. It comprises of a main mass 1001 that can slide with low friction on a supporting structure 1002. On the main mass 1001 there is a counterweight 1003 that moves with low friction between springs 1004. The excitation force is created by a piston in side a cylinder 1005 driven by an electrical motor 1006. The piston is connected to the main mass 1001 with brackets 1007 and the force created from the piston is measured by a force sensor (not shown). The vibrations of the main mass 1001 and counterweight 1003 are measured with laser displacement sensors. With the test rig 1000, the parameters of force, frequency, gap, spring coefficients, main mass, counterweight can be controlled. The test were made for two setups, one with the counterweight fixed to the main mass and one with the counterweight active. The results are compared to the simulated results in FIG. 12. Parameters were chosen for an optimum performance at 9 Hz.

The input data for the experiment and simulation were:

| | |
|---|---|
| M = 4.8 kg | main mass |
| m = 1.5 kg | counterweight mass |

-continued

| k = 14800 N/m | spring coefficient counterweight |
| K = 100 N/m | spring coefficient main mass |
| C = 100 Ns/m | damping main mass |
| c = 0.1 Ns/m | damping counterweight |
| a = 9 mm | gap from neutral position |

The excitation force in the simulation model were: F=(1.55*omega-20)*sin(omega*t) and this is an estimation of the measured input force.

FIG. 12 shows that the vibration amplitude of the main mass for the fixed counterweight (in FIG. 12 the counterweight is called counter mass), both when simulated and measured decreases almost linear when the working frequency increases. When the frequency is 4 Hz, the vibration amplitude is around 7.5 mm and when the frequency is 13 Hz, the vibration amplitude is around 3.5 mm peak. When the counterweight is active both the simulated and measured values follows almost the same curve. At a frequency of 4 Hz the amplitude is around 2.5-3 mm peak and it decreases as the frequency gets higher until it reach around a frequency of 9 Hz where the vibration amplitude is below 1 mm peak. The vibration amplitude increases then again as the frequency gets higher.

An example of the development method for the dimensioning of the vibration reduction arrangements described above comprises, as stated above, the steps of providing the input parameters, determining start values for the variable parameters and optimizing the vibration reduction arrangement. In the example case the input variables are as follows:

The main mass weighs 8 kg, which excludes the hammering element mass, counter weight and the impact receiving element.

The hammering element mass is 0.5 kg.

The counterweight has a total mass of 1 kg, (if there are several separate counterweights the weight is the total weight of all counterweights.)

From the development of the impact machine it is known that the main operating frequency f is 30 Hz. To accommodate variations in manufacturing tolerances, pneumatic pressure, applied force, etc. there is a variation around the main operating frequency resulting in an operating frequency range with a minimum frequency $f_{min}$ 25 Hz and a maximum frequency $f_{max}$ 35 Hz.

In order to improve the optimization process the excitation momentum on the main mass may be calculated and used as an input; Two ways of calculating this is to for example calculate the excitation momentum from the displacement and frequency of the hammering element, or to calculate the excitation force F from vibrations measured on the impact machine.

A goal of this exemplary development process is to determine optimal dimensions for the spring constant(s) k, the gap a and the spring pretension $F_0$. Where a is the distance D1 when the counterweight is in the central position. Starting values of these parameters are given by the following expression for an approximate value for the operating frequency:

$$f := \sqrt{\frac{k \cdot b^2}{m \cdot (4 \cdot a + 2 \cdot \pi \cdot b)^2} + \frac{F_0 \cdot b}{8 \cdot m \cdot (2 \cdot b + a)^2}}$$

The equations are based on that the main mass is standing still

The compression of the spring b under operation is given by an value which is being measured during a non-linear movement. This movement is then fed into the simulation model and optimized therefrom. However, for most cases an assumption regarding a sine-wave movement is an acceptable approximation.

The optimization is then performed by the method of Design of Experiments.

Figure 14:
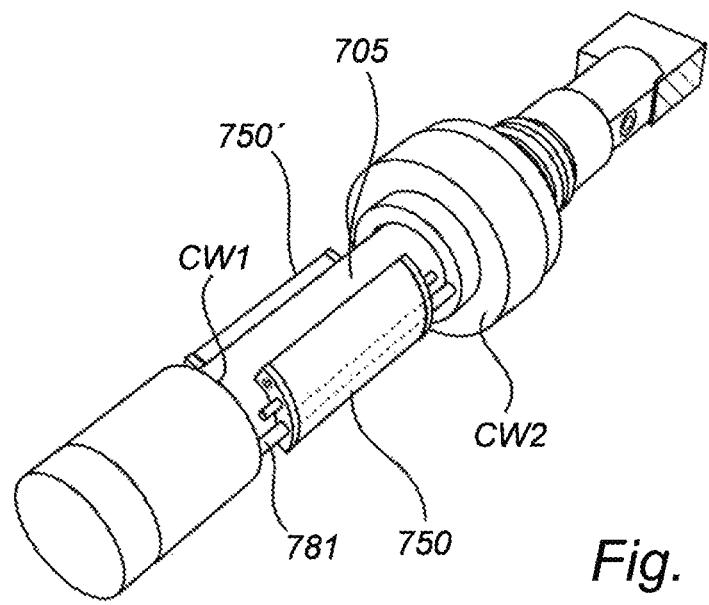
FIG. 14 is a schematic perspective view of an impact machine according to a further exemplary embodiment according to the invention.

FIG. 14 shows a schematic perspective view of a part of an impact machine according to another exemplary embodiment of the invention. The counterweight 750 is arranged only partly around the housing 705 of the hammering element. A second, counterweight 750' is arranged on the opposite side of the impact machine. The counterweights 750, 750' are movable between the first counterweight position CW1 and the second counterweight position CW2 in response to the impact action of the hammering element. Each counterweight 750, 750' is guided between the two positions CW1 and CW2 by means of counterweight guiding means 781. In this embodiment, each guiding means 781 is internally arranged within the counterweight 750, 750'. However, other possible modifications may include external guiding means, such as an external housing, which encloses and guides the counterweight by its periphery. The counterweights may have a cross-sectional internal design as disclosed in FIGS. 4-8 and 10a-11b however, each spring-action arrangement is instead arranged in a separate counterweight, they will however work in the same way.

Now referring to FIGS. 15a-15l, which schematically illustrate other examples of possible embodiments of the present invention. In common for all embodiments according to FIGS. 15a-15h is that the counterweight 550 is provided with an axial length Lccw between the contact surfaces 556, 557 of the counterweight 550. Furthermore, the first spring-action arrangement 560 is limited in its axial movement by a first end surface $S_{end1}$ and the second spring-action arrangement 572 is limited in its axial movement by a second end surface $S_{end1}$. The first spring action arrangement 560 has an unactuated length $L_{SA1}$, and the second spring action arrangement 572 has an unactuated length $L_{SA2}$. The unactuated length for the first spring action arrangement 560 is the distance between the end surface $S_{end1}$ and the contact endpoint 565. The unactuated length for the second spring action arrangement 572 is the distance between the surfaces $S_{end2}$ and the contact endpoint 575. The distance $D_{end}$ between the first $S_{end1}$ and the second end surface $S_{end2}$ is the total axial distance inside the vibration reduction arrangement. The counterweight 550 is axially movable in a first axial direction A, between a first CW1 and a second counterweight position CW2, in which the spring-action arrangements 560, 572 are compressed. Specifically, in the embodiments illustrated in FIGS. 15a-15h, the length of the gap $D_1$ can be calculated as:

$$D_1 = D_{ends} - L_{ccw} - L_{SA1} - L_{SA2}$$

FIG. 15a illustrates that the first 560, and the second spring-action arrangements 572 can include a first 562a, 572a and a second spring-action member 562b, 572b arranged in parallel as pair at each counterweight position CW1, CW2. The unactuated axial length of the first spring-action member 572a, 762a can be shorter than the axial length of the second spring-action member 572b, 562b included in a pair. However, the unactuated lengths of the first 560 and the second 572 spring-action arrangements $L_{SA1}$, $L_{SA2}$ are defined by the longest spring-action member.

Figure 15B:
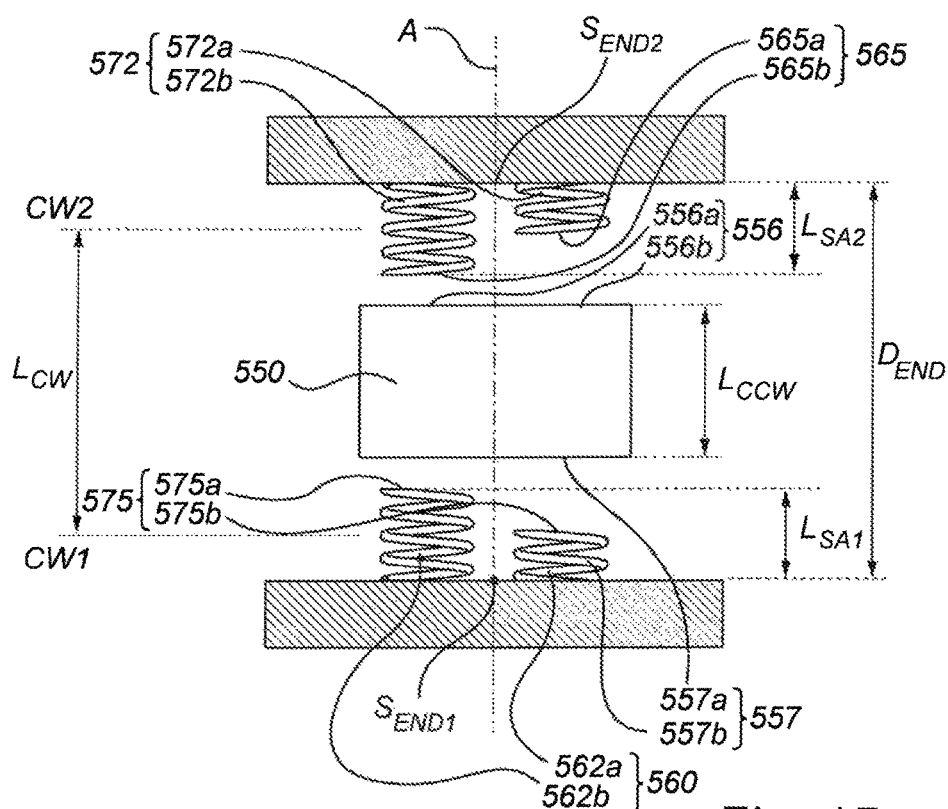
Figure 15C:
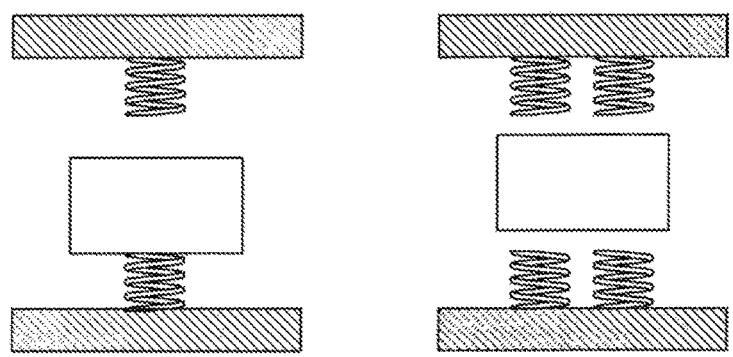

FIG. 15b illustrates that the first 560 and the second 572 spring-action arrangements can comprise a single spring-action member. FIG. 15c illustrates that the first 560 and the second spring-action arrangements 572 may include two spring-action members of the same length and which are arranged in parallel as pair at each counterweight position.

Figure 15D:
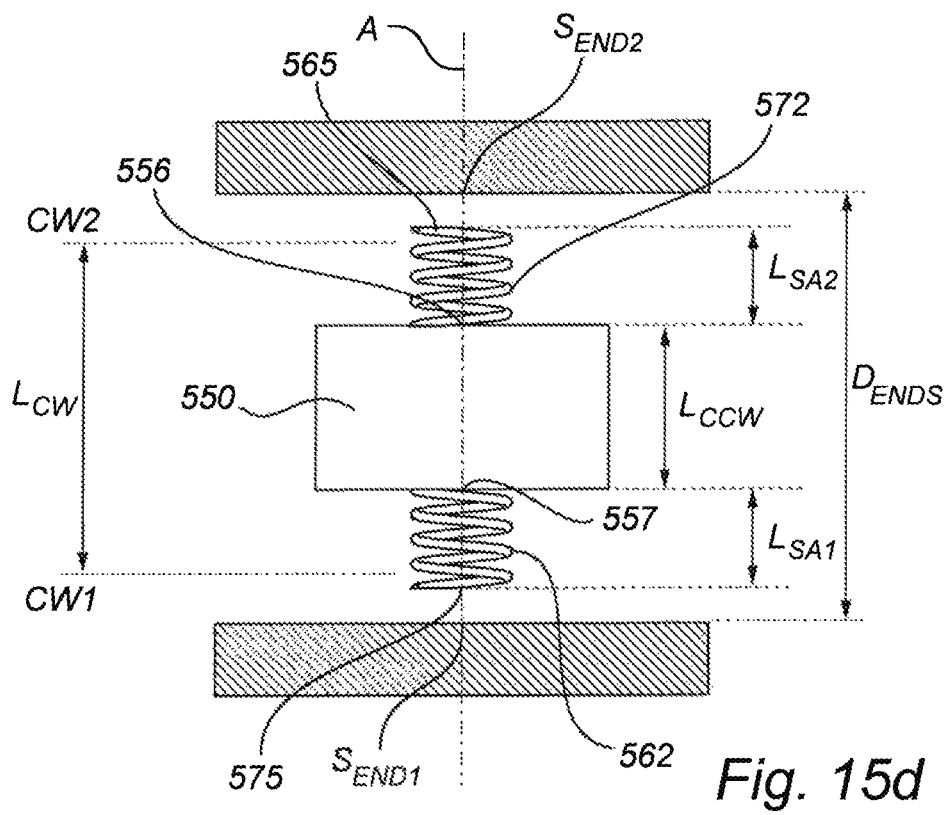
Figures 15E, 15F:
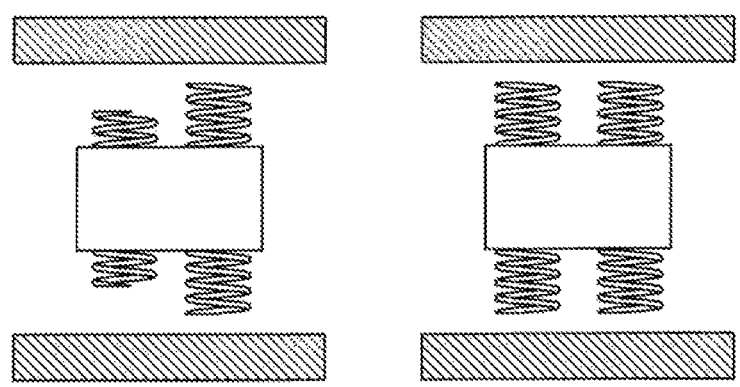

Now referring to FIG. 15d, which illustrates an embodiment spring-action arrangements are fixedly attached to the counterweight 550. However, the first $S_{end1}$ and the second end surfaces $S_{end2}$ serve as abutment surfaces in this case. Furthermore, FIGS. 15e and 15f show that it is also possible to modify the arrangement in FIG. 15d by arranging springs in parallel with the same or with different lengths.

Figure 15G:
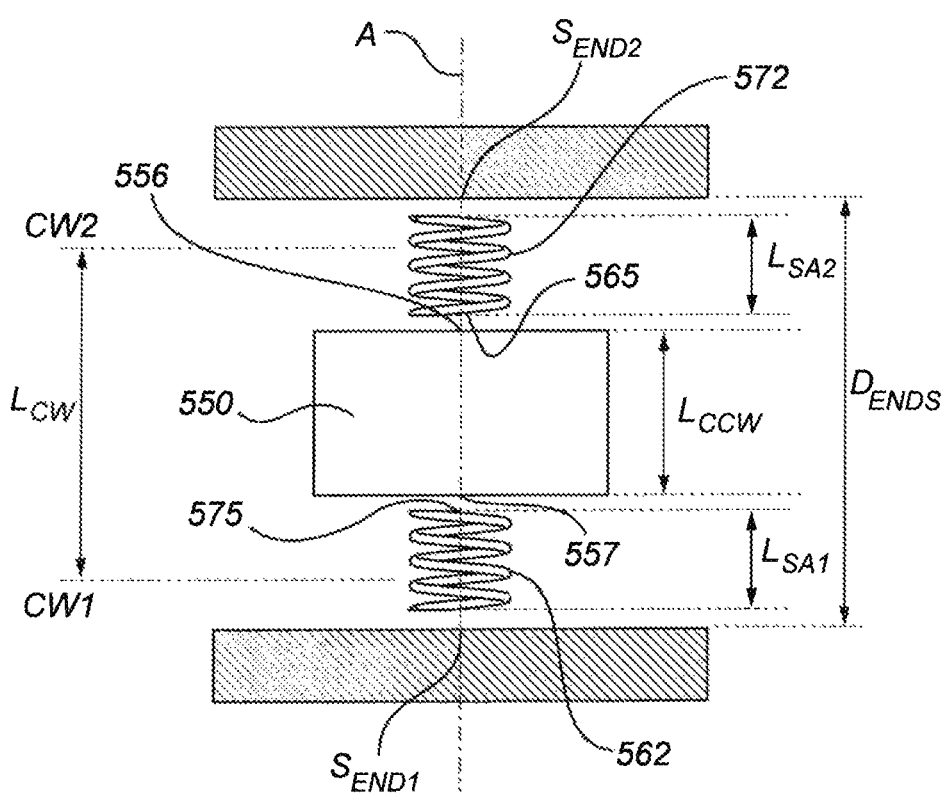

Now referring to FIG. 15g, which illustrates an embodiment, in which the first 560 and the second 572 spring-action arrangements consist of loose spring-action members 562, 572 arranged on each side of the counterweight 550, such that they are only abutting the end surfaces and an the counterweight 550.

Figure 15H:
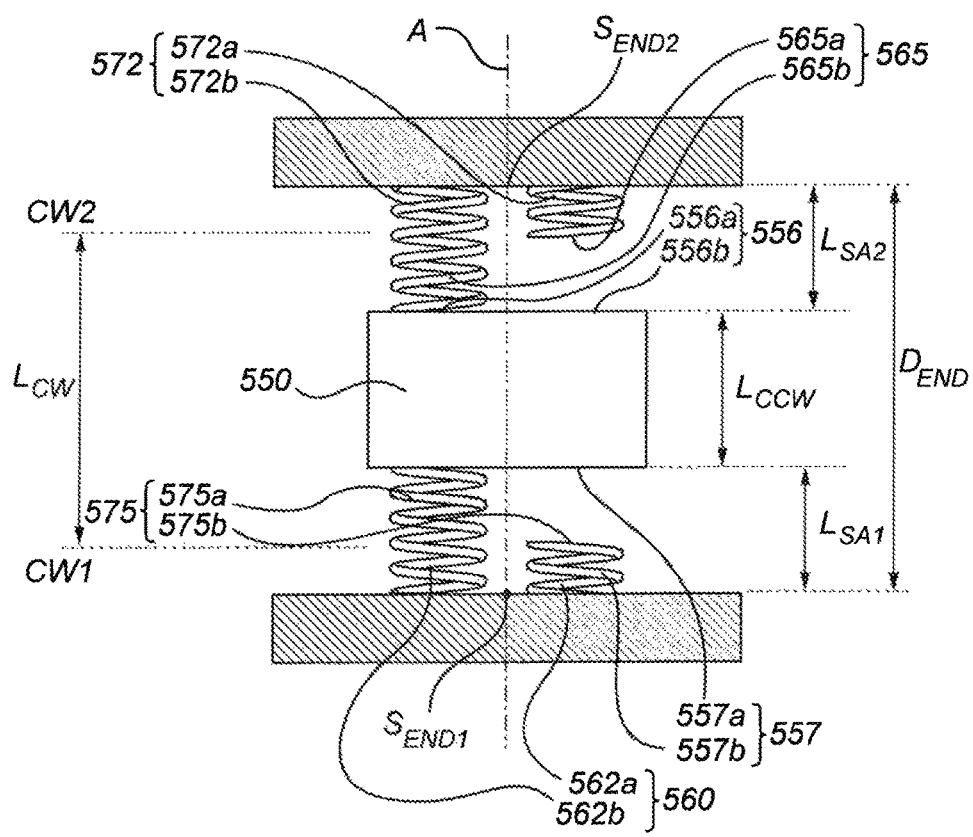

FIG. 15h illustrates a still further embodiment, in which a combination of a spring-action arrangement 560 attached to the counterweight 550 and a spring-action arrangement 572 attached to an end surface $S_{end1}$ is possible.

Figure 15I:
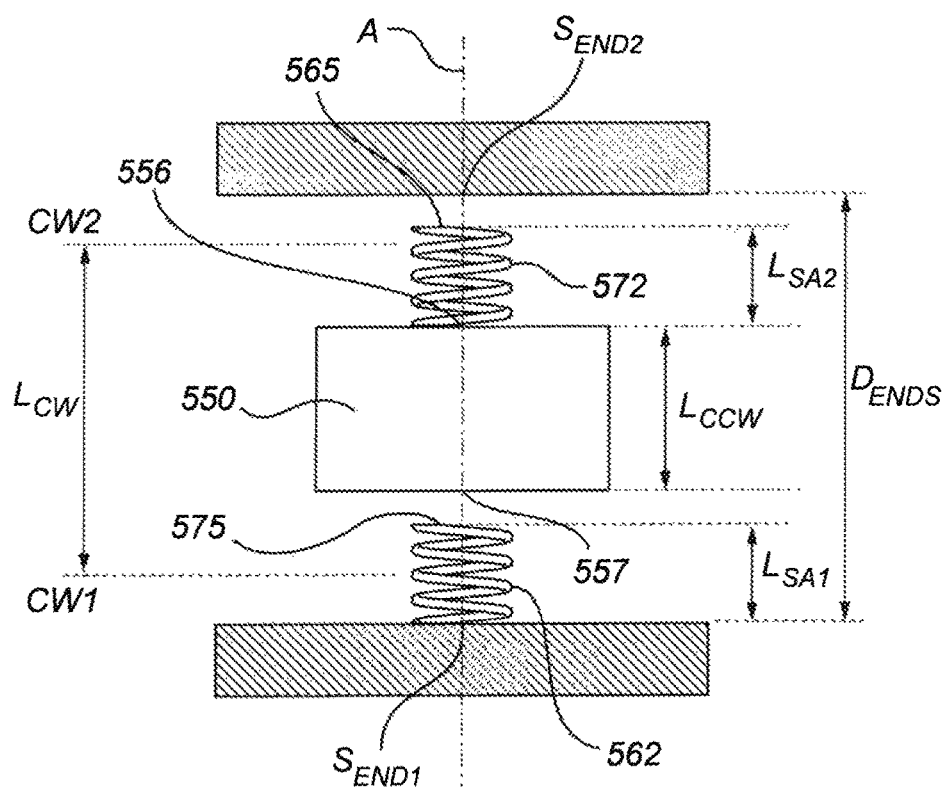

FIG. 15i illustrated another possible embodiment wherein a first spring action arrangement 560 comprises a first spring-action member 562a and a second spring-action member 562b with different lengths. The spring action members 562a, 562b are arranged in parallel with each other at a first counterweight position CW1. Furthermore, the longest spring-action member may be fixedly attached to the counterweight 550. Alternatively, the longest spring-action member may be abutting the counterweight 550 in an unactuated condition.

FIG. 15j illustrates an embodiment where the gap $D_1$ has been replaced by a weak spring-action member 561. The gap $D_1$ is thus represented by the unactuated length of the weak spring-action member 561 and can be calculated from the same relationship as for the FIGS. 15a-15h, or by simply measuring the length of the weak spring action member 561 itself.

Figure 15K:
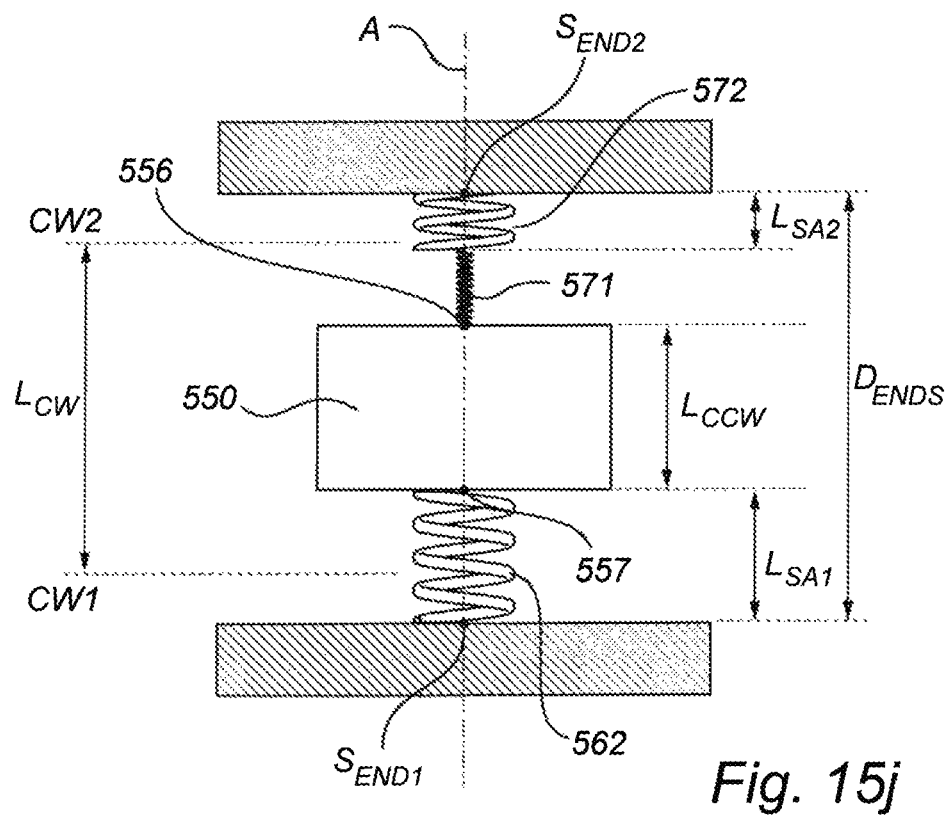
Figure 15L:
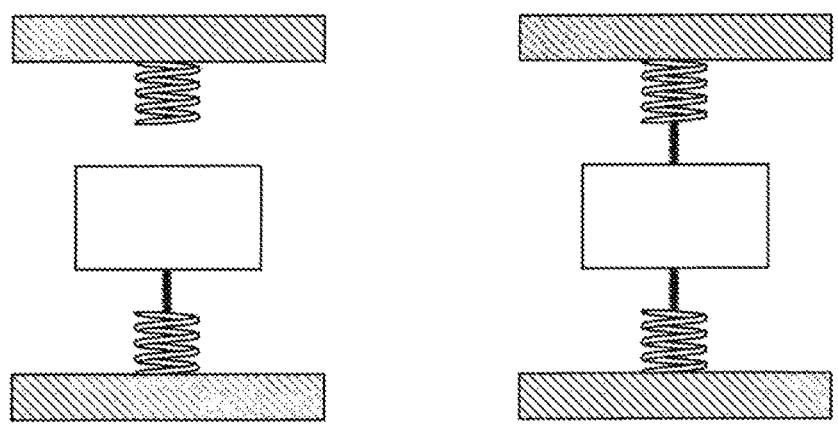

Additionally, other examples of constructions, are possible as variants or as complements For example, the first spring-action arrangement inside the counterweight may comprise more than one spring-action member, arranged in parallel or in series with the first spring-action member, in a similar manner to the examples described. Furthermore, the first spring-action arrangement inside the counterweight may be complemented by a second spring-action arrangement according to one of the illustrated examples, which are outside the counterweight. For instance, as illustrated in FIG. 15k, another embodiment may include a combination of a gap $D_1$ and a combination of at least two spring-action members 561, 562 with different spring coefficients, connected to each other in series at a first counterweight position CW1. At the second counterweight position CW2, a single spring-action member may be arranged. The counterweight 550 is not fixedly attached to the spring-action members. FIG. 15l illustrates still another possible embodiment which comprises at least two spring-action members with different spring coefficients connected in series at each counterweight position CW1, CW2, whereby the counterweight 550 is fixedly connected to the spring-action members.

Figure 16A:
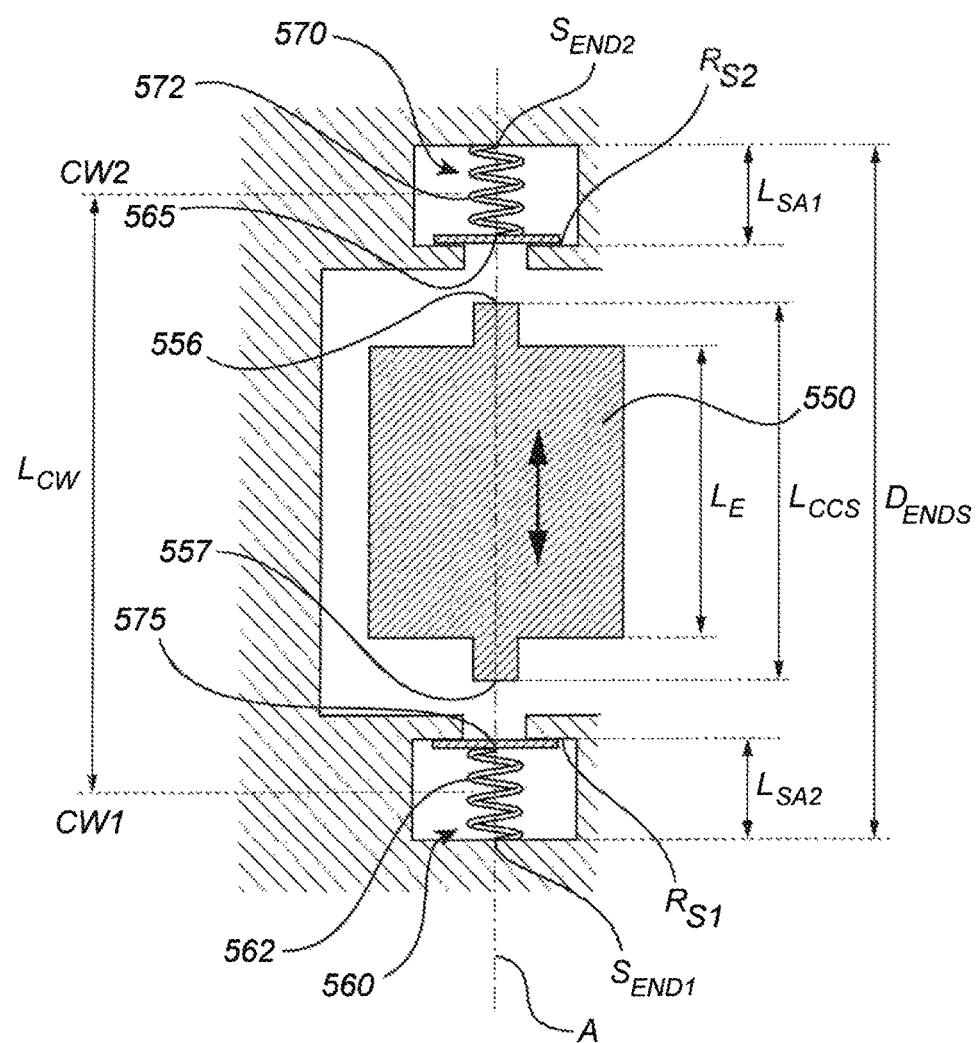
FIGS. 16a-16c are schematic perspective views of exemplary embodiments including biased spring-action members.
Figure 16B:
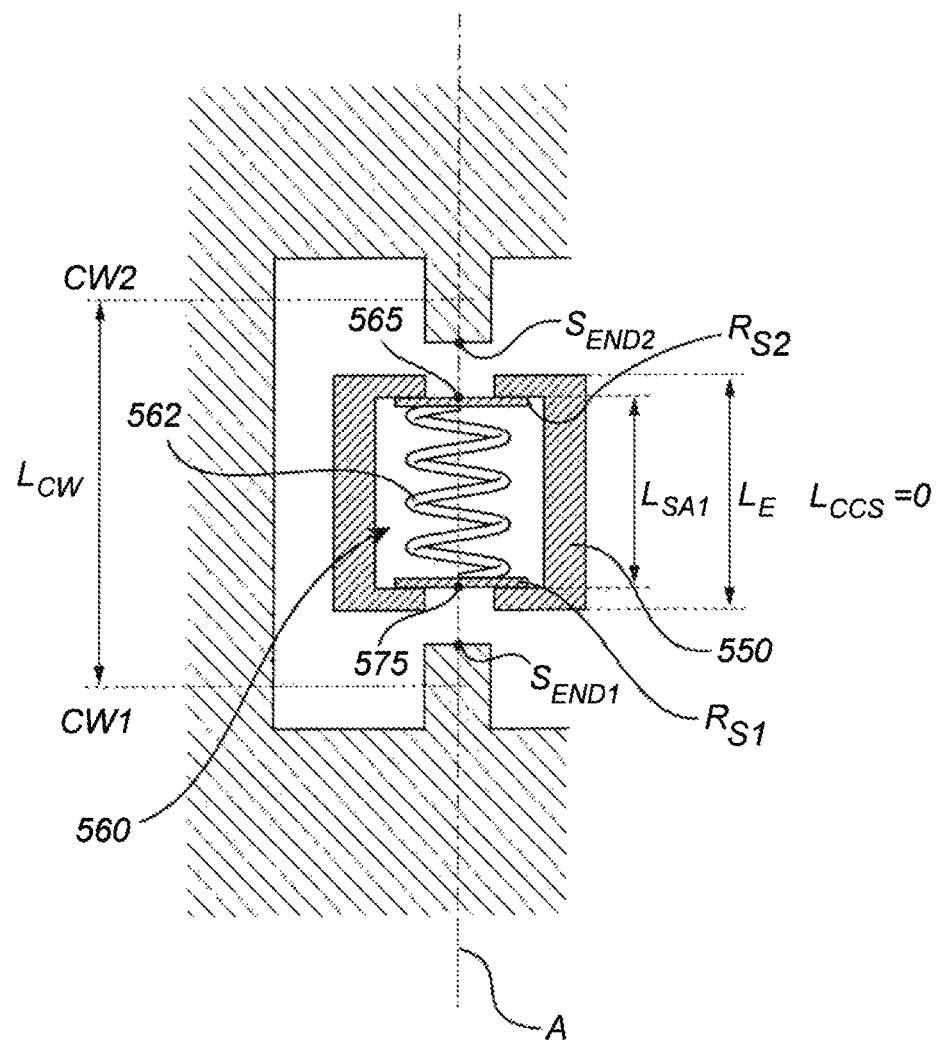
Figure 16C:
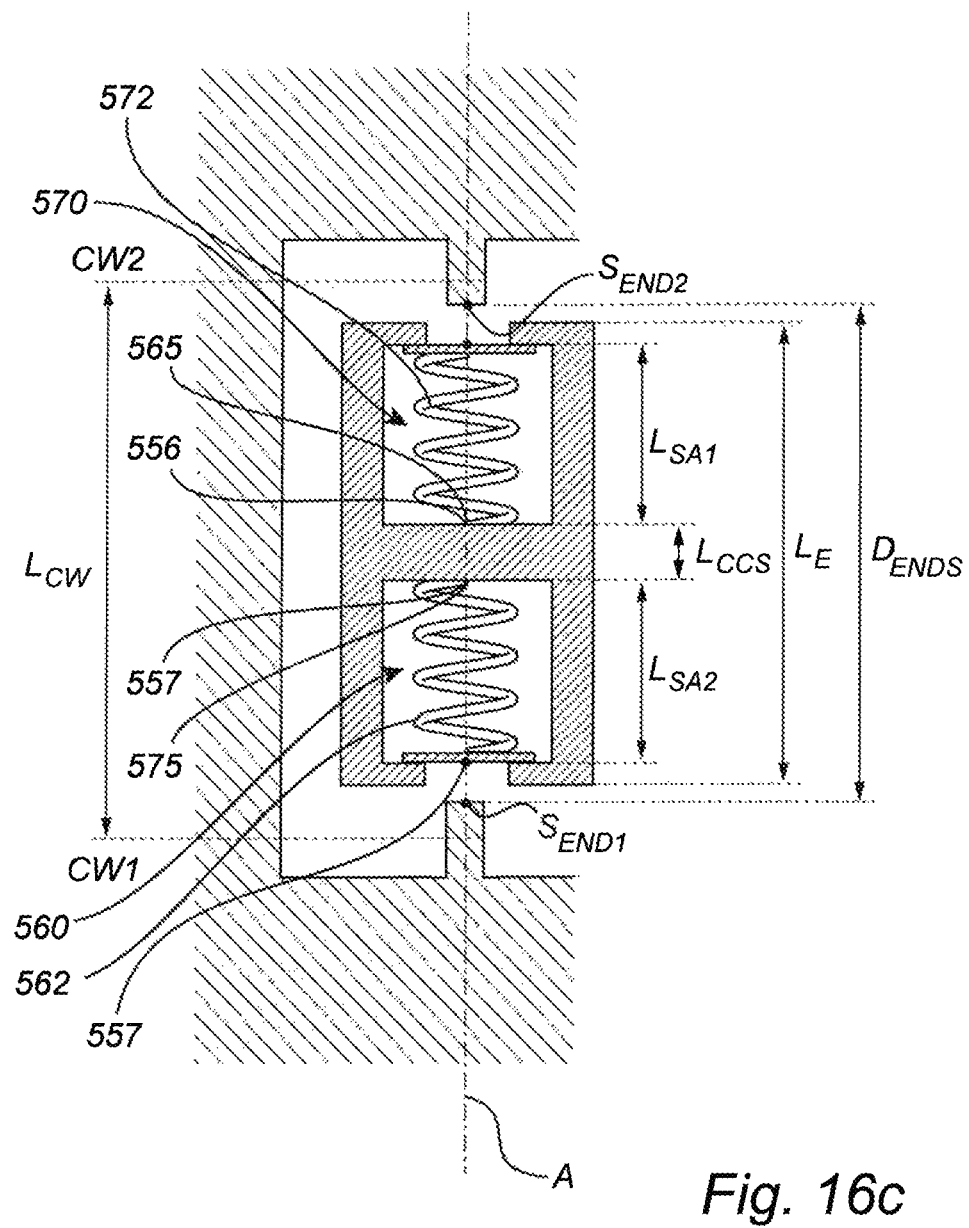

As schematically illustrated in FIGS. 16a-16c, other embodiments of the present invention may include biased spring-action arrangements. The length of the gap $D_1$ can be calculated from the same relationship as for the FIGS. 15a-15h.

As illustrated in FIG. 16a, a way to bias a spring-action arrangement is to retain it in a partially compressed state. The biased spring-action members 562, 572 are arranged in compartments defined by an end surface Send1, Send2 and a retaining surface $R_{S1}$, $R_{S2}$. The contact surfaces 556, 557 of the counterweight 550 may be adapted such that the axial length Lccs of the counterweight 550 between the counterweight contact surfaces 556, 557 is longer than an exterior length $L_E$ of the counterweight 550.

As illustrated in FIG. 16b, the spring-action arrangement 560 can be built-in inside the counterweight 550. The retaining surfaces are arranged inside the counterweight 550. The end surfaces $S_{end1}$, $S_{end2}$ are provided with a protruding portion such that an abutment with the spring-action arrangement 560 is possible. The protruding portions are dimensioned such that they only contact the spring action arrangement without hindrance or contact with other parts. In this embodiment, a single spring-action member 562 may be arranged inside the counterweight 550, with an axial extension between the first $R_{SA1}$ and the second retaining surfaces $R_{SA2}$. The length of the counterweight 550 in the direction between the contact points is null.

For embodiments with built-in spring action members, the distance of the gap $D_1$ can be calculated as the distance Lcw between the first CW1 and the second counterweight position CW2 subtracted by the exterior length $L_E$ (maximum axial length) of the counterweight 550.

As illustrated in FIG. 16c, a first 560 and a second spring-action arrangement 570 may be arranged inside the counterweight 550 and are separated by a wall inside the counterweight 550. The first 560 and the second spring-action arrangements 570 are retained by the wall inside the counterweight 550 at a first distal end and at a first retaining surfaces at the second distal end. The length of the counterweight in the direction between the contact points is null. The list of possible embodiments and modifications is non-exhaustive.

FIG. 17 shows a schematic perspective view of an impact machine according to another exemplary embodiment of the present invention. As shown in FIG. 17, the counterweight 350 has a cylindrical shape and is arranged around the housing 305 of the hammering element 310. The counterweight 350 is movable between the first counterweight position CW1 and the second counterweight position CW2 in response to the impact action of the hammering element 310. The counterweight 350 is guided between the two positions CW1 and CW2 by means of counterweight guiding means 381. In this embodiment, the guiding means 381 are internally arranged within the counterweight 350. However, other possible modifications may include external guiding means, such as an external housing, which encloses and guides the counterweight by its periphery. Motion reversing mechanisms 380, 390 are arranged at the first counterweight position CW1 and the second counterweight position CW2. In this embodiment, the motion reversing mechanisms 380, 390 comprise two coil springs arranged at each counterweight position CW1, CW2. A gap $D_1$ is arranged between a first counterweight position CW1 and the second counterweight position CW2. In particular the gap D1 is illustrated in FIG. 15a as the distance between a contact surface 356 of the counterweight 350 and a contact surface 365 of the spring-action member 362.

The working principle of an impact machine, as disclosed in the appended drawings, is to apply a reoccurring force upon the hammering element 110, 210, 310 such that the hammering element 110, 210, 310 performs a periodical movement between a first HE1 and a second HE2 hammering element position. A reoccurring force on the hammering element 110, 210, 310 is achieved by actuating means 115, 215, 315. Typically, hand-held impact machines operate with hydraulic, combustion engine or electric power, while larger machine-mounted impact devices are powered with hydraulics or pneumatics. The purpose of the actuating means 115, 215, 315 is to transfer impact energy to the hammering element 110 by either electric/mechanical, hydraulic or pneumatic means such that an impact force is applied to the hammering element. An example how this may be done is to periodically supply air or hydraulic fluid to and from an expandable chamber, which in turns transfers the force to the hammering element 110, 210, 310. In the second position HE2, the hammering element 110, 210, 310 is in mechanical contact with an implement 130, 230, 330, such as a work tool, whereby the hammering element 110, 210, 310 transfers a blow force to the implement 130, 230, 330. Correspondingly, the function of the vibration reduction arrangement 140, 240, 340 is to bring the counterweight 150, 250, 350 into a counter-phased movement in relation to the hammering element 110, 210, 310, such that the vibrations from the hammering element 110, 210, 310 are counter-acted by the vibrations from the counterweight movement. The implement/work tool 130, 230, 330 may be positioned in any direction, whereby the movement of the counterweight is aligned with the hammering element. In order to bring the counterweight 150, 250, 350 into the right counter-phased movement, the travel length and the spring coefficients cause the counterweight 150, 250, 350 to move according to a particular resonance frequency. However, it may be an advantage to rapidly bring the counterweight 150, 250, 350 into the right frequency so that the reduction effect may be instantaneously created when the impact machine is turned on. This may be achieved by applying an essentially instantaneous force on the counterweight, whereby the exhaust of pressurized air or liquid from the housing 105, 205, 305 of the hammering element may be used. A first motion reversing mechanism 160, 260, 360 is located at the second counterweight position (CW2) and a second motion reversing mechanism 170, 270, 370 is located at the first counterweight position. In particular, the motion reversing mechanisms 160, 170; 260, 270; 360, 370 receive and reverse the counterweight 150, 250, 350 as it moves between the first CW1 and second counterweight position CW2.

Figure 18:
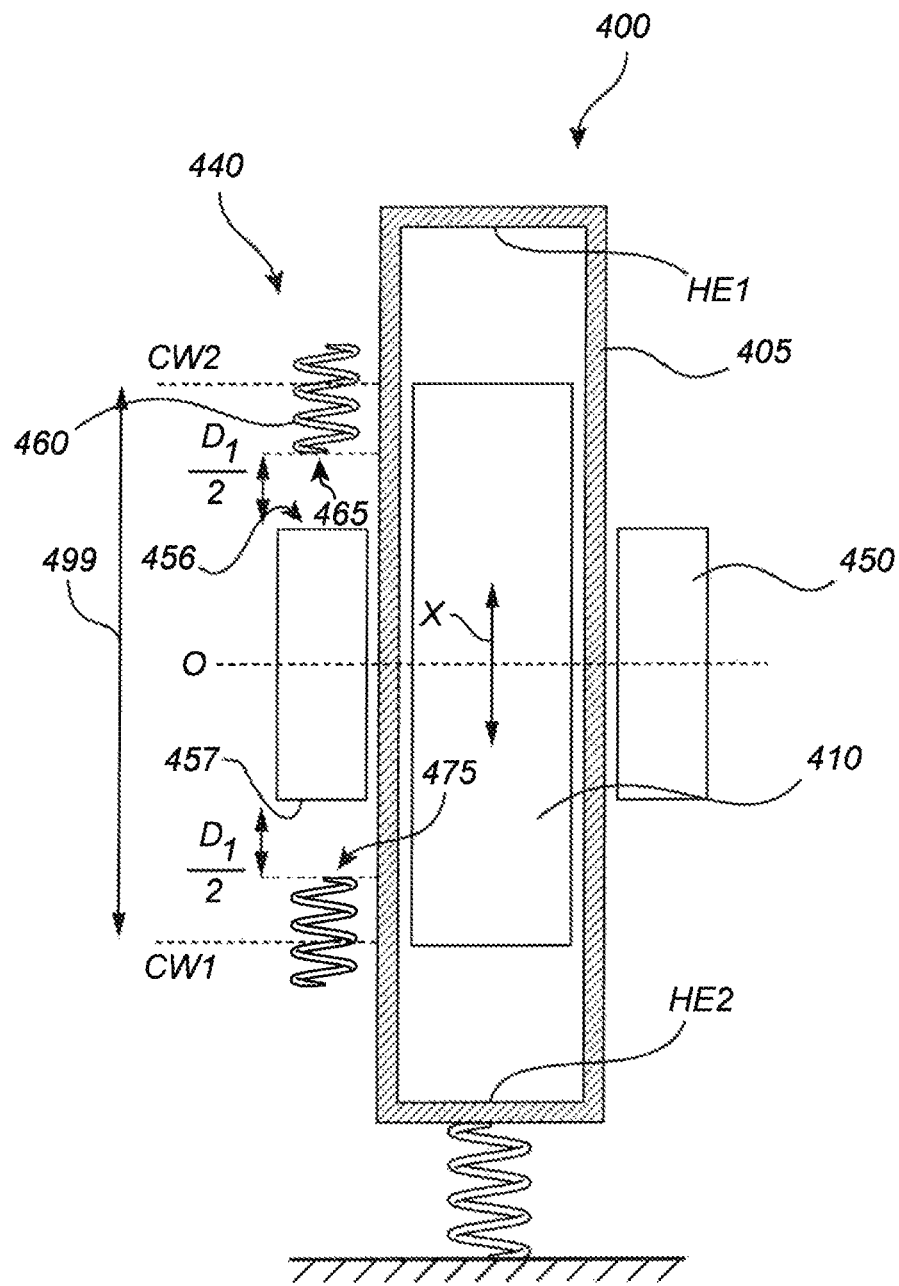
FIG. 18 is a cross-sectional schematic view of a impact machine, in which geometry of the vibration reduction arrangement is illustrated in detail.

FIG. 18 shows a schematic cross-sectional view of the principle components of the impact machine and the vibration reduction arrangement according to an exemplary embodiment. A dampening arrangement comprises a cylindrical counterweight 450 which encloses the housing 405 of the hammering element 410. The vibration reduction arrangement 440 may be dimensioned based on the impact machine's typical working frequency $f_{work}$ and the related vibration amplitude $V_a$. The weight H of the hammering element 410 and the distance between the first HE1 and the second HE2 hammering element position are thus typically known parameters. In addition, the weight M of the hammering element housing 405 M is a known parameter. Further, FIG. 18 may be used for exemplifying how the gap $D_1$ may be determined and for the embodiment illustrated in FIG. 16. Firstly, the vibration reduction arrangement 440 is arranged such that both spring-action arrangements 460, 470 are uncompressed, thereafter the counterweight 450 is arranged mid-way between the contact surfaces 465, 475 of the respective spring-action arrangements 460, 470. In a second step, the gap $D_1$ is determined.

Notably, the gap $D_1$ corresponds to a distance D ends between the contact surface 465 of the first spring-action arrangement 470 and a contact surface of the counterweight 456, and a second distance $D_1/2$ between a contact surface 475 of a second spring-action arrangement 470 and a second contact surface 457 of the counterweight 450. It is also provided that the first 460 and the second spring-action arrangement 470 are arranged on opposite sides of the counterweight 450. The principal concept of the vibration reduction arrangement is to counter-act the vibrations from the hammering element 410. By consequence, the maximum force $F_{HE}$ for the hammering element should therefore be essentially the same as the maximum force for the counterweight $F_{CW}$. In particular, the accelerating forces acting on the counterweight 450 and the hammering element 410 should be equal such that the counter force on the hammering element housing 405 is the same. The counterweight's 450 movement is restricted to a maximum counterweight displacement distance between a first counterweight position CW1 and a second counterweight position CW2. A movement beyond these points is thus not possible. Hence, depending on e.g. the hammering element 410 acceleration forces, the travel distance of the counterweight 450 may be at maximum travel distance, or shorter.

Hence, the distance between the first CW1 and the second counterweight position CW2 and the weight of the counterweight 410 may be varied and adapted to geometric and weight constraints of the impact machine. As in the practical example given in relation to the diagram in FIG. 2, the weight of the hammering element is 0.3 kg and the weight of the counterweight is 1 kg. The total weight of the hammer element housing is 3 kg.

The next step may be to select a resonance frequency $f_{res}$ of the counterweight. Based on a predetermined/desired working frequency of the impact machine, a resonance frequency of the counterweight is selected so that it lies sufficiently far above the predetermined working frequency of the impact machine so that the dampening effect is good at the working frequency. In this particular example, based on that the normal operating frequency of the machine is 30 Hz, the resonance frequency is selected to 32 Hz. Following, based on the selected counterweight resonance frequency $f_{res}$ the spring coefficient k for the counterweight may be determined from the following relationship:

$$f_{res} = \frac{b}{2D_1 + 2\pi b} \sqrt{\frac{k}{m}}$$

Where:
m: weight of the counterweight 300 (grams)
f: resonance frequency of the counterweight (Hz)
b: compressed distance of the spring(s)
In cases where there is no gap in the arrangement the coefficients are advantageously chosen by simulation.

Figure 19:
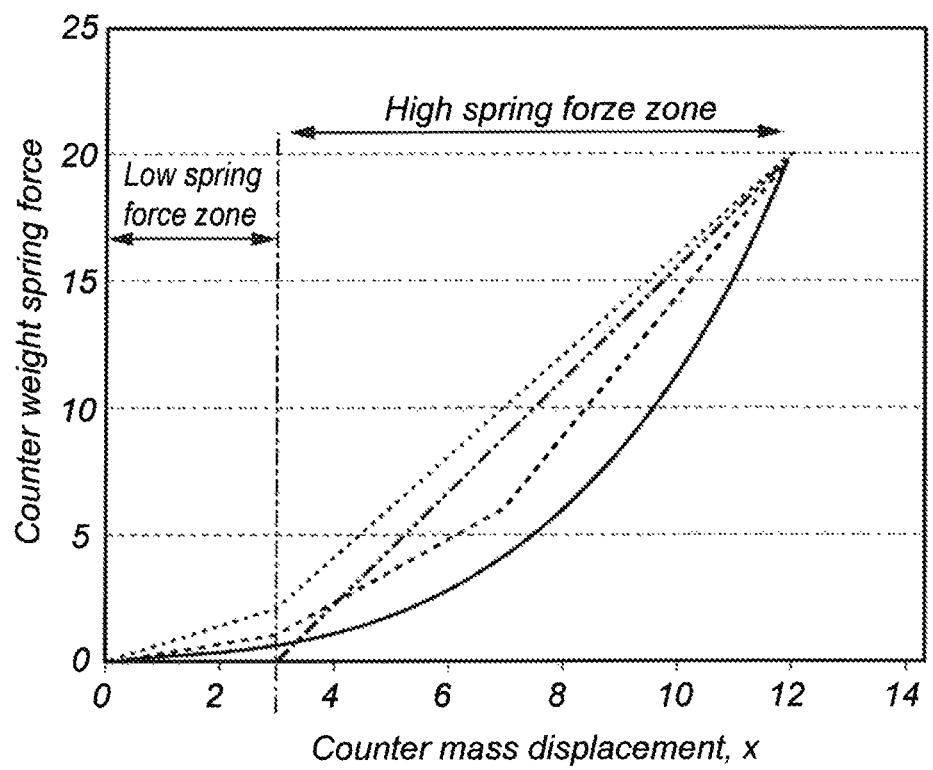
FIG. 19 is a diagram describing examples of the spring-action characteristics as a function of the counterweight displacement.

FIG. 19 illustrates a diagram with four different spring-action member embodiments, which present a non-linear spring-action force as a function of the counterweight displacement x. The inclination of the curves may be referred to as a spring coefficient k. FIG. 16 geometrically shows the counterweight displacements x in relation to an embodiment of the present invention $F_{k\ gap}$. Notably, as geometrically presented in FIG. 18, the starting point (at 0 mm) as illustrated in FIG. 16 relates to the position O, whereas the endpoint (at 12 mm) always relates to the position CW2 for all spring-action member embodiments. Moreover, the position 0 can be seen as when the counterweight 450 is in equilibrium, when the applied spring-action force is null.

Now referring to FIG. 19, a first configuration $F_{2\ springs}$ comprises a counterweight in contact with two spring-action members, connected in series at one side of the counterweight in its travel direction.

A second configuration $F_{1\ spring+Gap}$ comprise a counterweight is in contact with one spring-action members, but where a gap is introduced in the travel path of the counterweight. In the second configuration, it should be noted that the gap is actually only half a gap $D_1/2$, which is geometrically illustrated in FIG. 18. A third configuration $F_{3\ springs}$ relates to an embodiment of the present invention, where the counterweight is in contact with three spring-action members connected in series.

Due to the change in spring coefficient and depending on the stiffness of the spring-action members, the counterweight is being subject to two zones with a different spring coefficient: a "low spring force zone" and a "high spring force zone". The low spring-force zone corresponds to the beginning of the compression of a spring-action member, where the spring-action force on the counterweight is at its lowest level. The high spring-force zone corresponds to the end of the compression of a spring-action member, where the spring-action force on the counterweight is at its highest level. It has been realized in the context of the present invention that in order to achieve an efficient vibration reduction effect for a wide working frequency range, the length of the low spring-force zone may correspond to at least 25% of the length of the high spring-force; and the average spring coefficient in the low spring-force zone should be lower than 50% of the spring coefficient in the high spring-force zone. Another discovery from the experimental studies is that if the embodiment includes a gap, the distance of the gap may be selected to around 30% of the total travel distance between first CW1 and second counterweight position CW2.

In the relationship above, k stands for the total spring coefficient acting upon the counterweight in the "low" and "high" spring-action force. If the spring-action member is a combination of two spring-action members connected in series, then the spring coefficient for each spring-action member $k_1$ and $k_2$ should sum up to a total, i.e. an equivalent spring coefficient $k_{ekvl}$ according to the following equation:

$$\frac{1}{k_{ekv}} = \frac{1}{k_1} + \frac{1}{k_2}$$

FIGS. 20a to 20c illustrate different embodiments relating to the mounting of the vibration reduction arrangement. FIG. 20a shows an internally mounted vibration reduction arrangement 640. In this example, the vibration reduction arrangement 640 is integrated into the impact machine and may be mounted inside a housing 605 of the impact machine. As illustrated, the vibration reduction arrangement 640 may be centered around the displacement axis of the hammering element.

FIG. 20b shows another possible embodiment, where the vibration reduction arrangement 640 is externally mounted around the housing 605 of the impact machine an attached thereto with fastening means 647. An advantage of this arrangement is that it may be used as an attachment. The vibration reduction arrangement 640 may have a symmetrical and distributed counterweight around the circumference of the housing of the impact machine.

FIG. 20c shows another possible embodiment of the present invention where the counterweight's travel direction is off-set at an angle θ in relation to the travel direction of the hammering element. This embodiment may bring advantages if there is need to reduce vibrations in both vertical and horizontal direction.

EXEMPLIFYING EMBODIMENTS

Embodiment 1

An impact machine (100; 200) comprising:
a housing (105; 205)
a hammering element (110; 210) arranged inside said housing (105; 205), said hammering element (110; 210) is displaceable between a first hammering element position (H1) and a second hammering element position (H2),
an impact receiving element (130; 230) attached to said housing (105; 205),
actuating means (115; 215) arranged to cause said hammering element (110; 210) to perform a hammering operation on said impact receiving element (130; 230),
a vibration reduction arrangement (140; 240) attached to said housing (105; 205), which comprises:
    a counterweight (150; 250) being displaceable in a first axial direction (A) between a first counterweight position (CW1) and a second counterweight position (CW2) in response to the hammering action of said hammering element (110; 210),
    at least one motion reversing mechanism (180; 280) each of said motion reversion mechanism comprising at least one spring-action arrangement (160; 260), each of said at least one spring-action arrangements (160; 260), being arranged to reverse the direction of motion of said counterweight (150; 250),
wherein
said counterweight (150) is arrangeable at a position located between said first counterweight position (CW1) and said second counterweight position (CW2) from which position said counterweight (150) is movable a first distance (D1) extending in said first axial direction (A) without actuating said at least one spring-action arrangement (160);
or wherein
said vibration reduction arrangement (240) further comprises a first end surface ($S_{End1}$), said at least one spring action arrangement (260) being arranged between said counterweight (250) and said first end surface ($S_{End1}$), said at least one spring action arrangement (260) comprising a first spring-action member (261) attached to said counterweight (250), and a second spring-action member (272) arranged in series with said first spring-action member (261) in said first axial direction (A) and being attached to said first end surface ($S_{End1}$) and said first spring action member (261); said first spring-action member (261) having a first spring characteristics comprising a first spring coefficient ($k_1$) within the interval $-k_{trad} \leq k_1 \leq k_{trad}/2$ and $k_1 \neq 0$, and the second spring-action member (262) having a second spring characteristics comprising a second spring coefficient ($k_2$) within the interval $k_{trad}/5 \leq k_2 \leq 30*k_{trad}$, and $k_{trad}$ is determined from the following formula $$F_{res} = \frac{1}{2\pi}\sqrt{\frac{k_{trad}}{m}}$$

$F_{res}$ being the resonance frequency of the impact machine at rated power, and m the weight of the counterweight (250), or wherein said vibration reduction arrangement (540) further comprises a first end surface ($S_{End1}$), said at least one spring action arrangement (560) being arranged between said counterweight (550) and said first end surface ($S_{End1}$), said at least one spring action arrangement (560) comprising a first spring-action member (562a) and a second spring-action member (562b), a first end of said first spring action member (562a) and second spring-action member (562b), respectively, is attached to said counterweight (550); a second end of said first spring action member (562a) and second spring-action member (562b), respectively, are attached to said first end surface ($S_{End1}$), said first (562a) and second spring members (562b) being arranged in parallel with each other in said first axial direction (A), wherein the first spring-action member (562a) having a first spring characteristics comprising a first spring coefficient ($k_1$) being arranged within the interval $-k_{trad} \leq k_1 \leq k_{trad}/2$ and $k_1 \neq 0$, and the second spring-action member (562) having a second spring characteristics comprising a second spring coefficient $k_2$, arranged within the interval $k_{trad}/5 \leq k_2 \leq 30 \cdot k_{trad}$, and $k_{trad}$ is determined from the following formula $$F_{res} = \frac{1}{2\pi}\sqrt{\frac{k_{trad}}{m}}$$

$F_{res}$ being the resonance frequency of the impact machine at rated power, and m the weight of the counterweight (550).

Embodiment 2

The impact machine according to embodiment 1, wherein said counterweight (550) is arrangeable at a position located between said first counterweight position (CW1) and said second counterweight position (CW2) from which position said counterweight (550) is movable a first distance (D1) extending in said first axial direction (A) without actuating said at least one spring-action arrangement (160) and said at least one spring action arrangement (560) being arranged inside said counterweight (550), and said vibration reduction arrangement further comprises:

a first end surface ($S_{End1}$) arranged adjacent to said first counterweight position (CW1) and
a second end surface ($S_{End2}$) arranged adjacent to said second counterweight position (CW2);
said first end surface ($S_{End1}$) is arranged to receive said at least one spring action arrangement (560) when in motion towards said first counterweight position (CW1); and
said second end surface ($S_{End2}$) is arranged to receive said at least one spring action arrangement when in motion towards said second counterweight position (CW1).

Embodiment 3

The impact machine according to embodiment 2, wherein said at least one spring action arrangement (560) comprises a first spring action member, which first spring action member is prestressed, said first spring action member having a first spring characteristics ($k_1$) within the interval $k_{trad}/5 \leq k_1 \leq 30 \cdot k_{trad}$.

Embodiment 4

The impact machine according to embodiment 1, wherein said counterweight (150) is arrangeable at a position located between said first counterweight position (CW1) and said second counterweight position (CW2) from which position said counterweight (150) is movable a first distance (D1) extending in said first axial direction (A) without actuating said at least one spring-action arrangement (160) and wherein said vibration reduction arrangement (140) further comprises:

a first end surface ($S_{End1}$) arranged adjacent to said first counterweight position (CW1), and
a second end surface ($S_{End2}$) arranged adjacent to said second counterweight position (CW2); and
said at least one motion reversing mechanism comprises a first motion reversing mechanism and a second motion reversing mechanism, and the at least one spring action arrangement of said first motion reversing mechanism is arranged between said counterweight and said first end surface ($S_{End1}$),
and the at least one spring action arrangement of said second motion reversing mechanism is arranged between said counterweight and said second end surface ($S_{End2}$), Embodiment 5

The impact machine according to embodiment 4, wherein said first spring action arrangement is attached to said first end surface ($S_{End1}$), and said first spring action arrangement is arranged to receive said counterweight when in motion towards said first counterweight position (CW1).

Embodiment 6

The impact machine according to embodiments 4 or 5, wherein said second spring action arrangement (170) is attached to said second end surface ($S_{End1}$), and said first spring action arrangement (160) is arranged to receive said counterweight (150) when in motion towards said first counterweight position (CW1).

Embodiment 7

The impact machine according to embodiments 4 or 6, wherein said first spring action arrangement (260) is attached to said counterweight, and said first end surface is arranged to receive said first spring arrangement when said counterweight is in motion towards said first counterweight position (CW1).

Embodiment 8

The impact machine according to embodiments 4, 5 or 7, wherein said second spring action arrangement is attached to said counterweight, and said second end surface is arranged to receive said second spring arrangement when said counterweight is in motion towards said first counterweight position (CW1).

Embodiment 9

The impact machine according to embodiments 4, 6 or 8, wherein said first spring action arrangement is arrangeable at a position located between counterweight and said first end surface from which position said first spring arrangement is movable a first distance (D1) extending in said first axial direction without actuating said first spring-action arrangement.

Embodiment 10

The impact machine according to embodiments 5, 7 or 9, wherein said second spring action arrangement is arrangeable at a position located between counterweight and said second end surface from which position said second spring arrangement is movable a first distance (D1) extending in said first axial direction without actuating said second spring-action arrangement.

Embodiment 11

The impact machine according to any one of the embodiments 4-10, wherein said first spring action arrangement comprises a first spring action member, which first spring action member is biased, and/or wherein said second spring action arrangement comprises a second spring action member, which second spring action member is biased.

Embodiment 12

The impact machine according embodiment 1, wherein said first spring-action member and a second spring-action member (272) are arranged in series or parallel in said first axial direction (A); said first spring-action member (261) having a first spring coefficient ($k_1$) within the interval $-k_{trad} \leq k_1 \leq k_{trad}/2$ and $k_1 \neq 0$, the second spring-action member (262) having a second spring coefficient ($k_2$) within the interval $2*k_{trad} \leq k_2 \leq 30$ and the second spring member is not prestressed.

Embodiment 13

The impact machine according to embodiment 1, wherein said first spring-action member and a second spring-action member (272) are arranged in series or parallel in said first axial direction (A); said first spring-action member (261) having a first spring coefficient ($k_1$) within the interval $-k_{trad} \leq k_1 \leq k_{trad}/2$ and $k_1 \neq 0$, the second spring-action member (262) having a second spring coefficient ($k_2$) within the interval $k_{trad}/5 \leq k_2 \leq 30$ and the second spring member is prestressed.

Embodiment 14

The impact machine according to any one of the embodiments 2-11, wherein the spring coefficient k for the spring-action arrangement acting on the counterweight (150; 250) may be determined from the following formula with a deviation from the calculated value of less than 50%, or less than 30%, or less than 20% or less than 10%; and wherein f is the resonance frequency of the impact machine at rated power, k is the spring coefficient, m is the weight of the counterweight (150; 250), $D_1$ is said first distance and b is the compression distance of the at least one spring arrangement of said first motion reversing mechanism (160; 260).

$$f = \sqrt{\frac{k}{m}} * \left(\frac{b}{2\pi b + 2D_1}\right)$$

Embodiment 15

The impact machine according to anyone of embodiments 1-11 or 14, wherein the first distance ($D_1$) is at least at least 20%, or at least 40%, or at least 60% or at least 70% or at least 80% or at least 90% of the distance between the first (CW1) and the second (CW2) counterweight positions.

Embodiment 16

The impact machine according to anyone of embodiments 1, 12 or 13, wherein a first spring action member (261) and a second spring action member (262) arranged in series or in parallel, wherein the first spring coefficient of the first spring-action member (261) is lower than the second spring coefficient of the second spring-action member (262), and wherein that the first spring coefficient applies to a distance corresponding to at least 10% or at least 15% or at least 20% or at least 25% of the distance between the first CW1 and the second CW2 counterweight position; and the second spring coefficient applies to a remaining distance between the first CW1 and the second counterweight position CW2.

Embodiment 17

The impact machine according to embodiment 16, wherein the first spring coefficient is at least 50% lower than the second spring coefficient.

Embodiment 18

An impact machine according to anyone of the preceding embodiments, further comprising hammer element guiding means (120, 220, 320) arranged to cause said hammering element (110, 210, 310) to move in a linear direction between said first hammering element position (HE1) and said second hammering element position (HE2).

Embodiment 19

An impact machine according to anyone of the preceding embodiments, further comprising counterweight guiding means (381) arranged to cause said counterweight (350) to move in a linear direction between said first counterweight position (CW1) and said second counterweight position (CW2).

Embodiment 20

An impact machine according to any one of the preceding embodiments, wherein said impact receiving element (130; 230) is a work tool.

Embodiment 21

An impact machine according to anyone of the preceding embodiments, wherein said impact machine (100; 200) is handheld.

Embodiment 22

An impact machine according to anyone of the preceding embodiment, wherein said impact machine is arranged to be attached to a machine, preferably a construction machine such as an excavator, backhoe loader or skid steer loader.

Embodiment 23

An impact machine according to anyone of the preceding embodiments, wherein the weight of the hammering element H corresponds to between 20% and 300% of the weight m of the counterweight (150; 250).

The skilled person will realize that the present invention by no means is limited to the described exemplary embodiments. The mere fact that certain measures are recited in mutually different dependent claims does not indicate that a combination of these measures cannot be used to advantage. Moreover, the expression "comprising" does not exclude other elements or steps. Other non-limiting expressions include that "a" or "an" does not exclude a plurality and that a single unit may fulfill the functions of several means. Any reference signs in the claims should not be construed as limiting the scope. Finally, while the invention has been illustrated in detail in the drawings and in the foregoing description, such illustration and description are considered to be illustrative or exemplary and not restrictive; the invention is not limited to the disclosed embodiments.

The invention claimed is:

1. An impact machine comprising:
   a housing
   a hammering element arranged inside said housing, said hammering element is displaceable between a first hammering element position and a second hammering element position,
   an impact receiving element attached to said housing,
   actuating means arranged to cause said hammering element to perform a hammering operation on said impact receiving element,
   a vibration reduction arrangement attached to said housing, which comprises:
   at least one counterweight distributed around said hammering element and being displaceable in a first axial direction between a respective first counterweight position and a respective second counterweight position in response to the hammering operation of said hammering element,
   a respective first motion reversing mechanism for each one of said at least one counterweight, each respective first motion reversing mechanism comprising a first spring-action arrangement being arranged to reverse the direction of motion of a respective one of said at least one counterweight,
   wherein
   each one of said at least one counterweight is arrangeable at a position located between said respective first counterweight position and said respective second counterweight position from which position each one of said at least one counterweight is moveable a first distance extending in said first axial direction without actuating said first spring-action arrangement; and wherein
   the first spring action arrangement of said respective first motion reversing mechanism is arranged inside said respective one of said at least one counterweight,
   each of said respective first motion reversing mechanism further comprises a first end surface attached to said housing and arranged adjacent to said respective first counterweight position and
   each one of said at least one counterweight comprises a first projecting member, which projecting member comprises an engaging surface, which engaging surface is connected to said respective spring action arrangement and arranged between said respective spring action arrangement and said first end surface in said first axial direction wherein
   when any of said at least one counterweight is arranged in said respective first counterweight position:
   said engagement surface and said first end surface are pressed against each other, and
   said at least one spring-action arrangement is actuated.

2. The impact machine according to claim 1, wherein said counterweight further comprising restricting means adapted to restrict the movement of said projecting member in the first axial direction and/or in a direction opposite thereto, and wherein said restricting means comprises at least one first retaining surface attached to said counterweight, and said projecting member further comprises at least one flange, wherein said retaining surface restricts the motion of said flange in the first axial direction and/or in a direction opposite thereto.

3. The impact machine according to claim 1, wherein said vibration reduction arrangement is arranged around said housing, such that said at least one counterweight is rotatable about a central longitudinal axis of said housing, coaxial with said first axial direction.

4. The impact machine according to claim 1, wherein when said at least one counterweight is only one counterweight, said counterweight fully surrounds said hammering element.

5. The impact machine according to claim 1, wherein the first distance is at least 20%, or at least 40%, or at least 60% or at least 70% or at least 80% of the distance between the first and the second counterweight positions.

6. The impact machine according to claim 1, wherein the weight of the hammering element H corresponds to between 20% and 300% of the weight m of the counterweight.

7. An impact machine comprising:
   a housing
   a hammering element arranged inside said housing, said hammering element is displaceable between a first hammering element position and a second hammering element position,
   an impact receiving element attached to said housing,
   actuating means arranged to cause said hammering element to perform a hammering operation on said impact receiving element,
   a vibration reduction arrangement attached to said housing, which comprises:
   a counterweight distributed around said hammering element and being displaceable in a first axial direction between a first counterweight position and a second counterweight position in response to the hammering operation of said hammering element,
   a first motion reversing mechanism comprising a first spring-action arrangement being arranged to reverse the direction of motion of said counterweight,
   wherein
   said counterweight is arrangeable at a position located between said first counterweight position and said second counterweight position from which position said counterweight is moveable a first distance extending in said first axial direction without actuating said spring-action arrangement; and wherein
   the first spring action arrangement of said motion reversing mechanism is arranged inside said counterweight,
   said first motion reversing mechanism further comprises a first end surface attached to said housing and arranged adjacent to said first counterweight position and
   said counterweight comprises a first projecting member, which projecting member comprises an engaging surface, which engaging surface is connected to said first spring action arrangement and arranged between said spring action arrangement and said first end surface in said first axial direction wherein
   when said counterweight is arranged in said first counterweight position:
   said engagement surface and said first end surface are pressed against each other, and
   said at least one spring-action arrangement is actuated.

8. An impact machine comprising:

a housing a hammering element arranged inside said housing, said hammering element is displaceable between a first hammering element position and a second hammering element position, an impact receiving element attached to said housing, actuating means arranged to cause said hammering element to perform a hammering operation on said impact receiving element, a vibration reduction arrangement attached to said housing, which comprises:

a first number of counterweights arranged evenly distributed around said hammering element, each first number of counterweights being displaceable in a first axial direction between a respective first counterweight position and a respective second counterweight position in response to the hammering operation of said hammering element, a first number of motion reversing mechanisms, each comprising a first spring-action arrangement being arranged to reverse the direction of motion of a respective one of said first number of counterweights, wherein said each one of said first number of counterweights is arrangeable at a position located between said respective first counterweight position and said respective second counterweight position from which position each one of said first number of counterweights is moveable a first distance extending in said first axial direction without actuating said at least one spring-action arrangement; and wherein said first spring action arrangement of each first motion reversing mechanism is arranged inside said respective one of said first number of counterweights, each of said respective first motion reversing mechanism further comprises a respective first end surface attached to said housing and arranged adjacent to said respective first counterweight position and each one of said at least first number of counterweights comprises a first projecting member, which projecting member comprises an engaging surface, which engaging surface is connected to said respective spring action arrangement and arranged between said respective first spring action arrangement and said first end surface in said first axial direction, wherein when any one of said first number of counterweights is arranged in said respective first counterweight position:

said engagement surface of said first number of counterweights and said respective first end surface are pressed against each other, said engagement surface is displaced relative a center of gravity of said first number of counterweights compared to when said counterweight is arranged in a position where said engagement surface and said first end surface are separated from each other, and said at least one spring-action arrangement is actuated.

* * * * *